United States Patent
Franke et al.

(10) Patent No.: US 6,183,672 B1
(45) Date of Patent: Feb. 6, 2001

(54) EXTRUSION DIE FOR BIODEGRADABLE MATERIAL WITH DIE ORIFICE MODIFYING DEVICE AND FLOW CONTROL DEVICE

(75) Inventors: Hans G. Franke, Incline Village, NV (US); Donald R. Bittner, Irving, TX (US)

(73) Assignee: Standard Starch, LLC, Tampa, FL (US)

(*) Notice: Under 35 U.S.C. 154(b), the term of this patent shall be extended for 0 days.

(21) Appl. No.: 09/035,200

(22) Filed: Mar. 5, 1998

(51) Int. Cl.$^7$ .............................. B29C 47/24; B29C 47/92
(52) U.S. Cl. ................. 264/40.7; 264/209.2; 264/290.8; 264/210.2; 425/145; 425/380; 425/382.3; 425/382.4; 425/466; 425/467
(58) Field of Search ............................... 264/40.7, 209.2, 264/209.8, 210.2; 425/145, 380, 382.3, 382.4, 466, 467

(56) References Cited

U.S. PATENT DOCUMENTS

| | | |
|---|---|---|
| 3,137,592 | 6/1964 | Protzman et al. . |
| 4,125,495 | 11/1978 | Griffin . |
| 4,133,784 | 1/1979 | Otey et al. . |
| 4,337,181 | 6/1982 | Otey et al. . |
| 4,454,268 | 6/1984 | Otey et al. . |

(List continued on next page.)

FOREIGN PATENT DOCUMENTS

| | | |
|---|---|---|
| 788896 | 7/1968 | (CA) . |
| 420593 | 3/1967 | (CH) . |
| 659706 | 4/1938 | (DE) . |
| 147351 | 4/1969 | (DE) . |
| 297 07 060 U1 | 4/1997 | (DE) . |
| 183 153 | 6/1986 | (EP) . |
| 712 883 A1 | 5/1996 | (EP) . |
| 1542310 | 10/1968 | (FR) . |
| 1183027 | 3/1970 | (GB) . |
| 270677 | 7/1964 | (NL) . |
| WO 90/15706 | 12/1990 | (WO) . |

OTHER PUBLICATIONS

International Search Report No. PCT/US90/03394, dated Nov. 2, 1990.
EPO Standard Search Report No. RS 100726, dated May 13, 1998.
EPO Standard Search Report No. RS 100729 DE, dated May 19, 1998.

Primary Examiner—Leo B. Tentoni
(74) Attorney, Agent, or Firm—R. William Beard, Jr.; Frohwitter

(57) ABSTRACT

An extrusion die for extruding biodegradable material, the extrusion die including: a mandrel; an outer member positioned near the mandrel; an extrusion orifice between the mandrel and the outer member; a member in communication with at least one defining member of the extrusion orifice, wherein the member is capable of producing relative movement between the outer member and the mandrel, wherein the relative movement has a component transverse to an extrusion direction of biodegradable material through the extrusion orifice; a flow control device which controls flow of biodegradable material through the extrusion die; and a positioning device which positions the outer member and the mandrel relative to each other. An improved process for the extrusion of biodegradable material wherein the extrusion includes flowing the biodegradable material in a flow direction through an orifice, the improvement including: moving the biodegradable material in a direction having a component transverse to the flow direction during extrusion; controlling the flow rate of biodegradable material through the extrusion die during extrusion, wherein the controlling includes adjusting the head pressure of the biodegradable material in the extrusion die and adjusting at least one cross-sectional area of a biodegradable material flow path within the extrusion die; and modifying the orifice geometry.

24 Claims, 15 Drawing Sheets

U.S. PATENT DOCUMENTS

| | | |
|---|---|---|
| 4,673,438 | 6/1987 | Wittwer et al. . |
| 5,087,650 | 2/1992 | Willett . |
| 5,095,054 | 3/1992 | Lay et al. . |
| 5,186,990 | 2/1993 | Starcevich . |
| 5,208,267 | 5/1993 | Neumann et al. . |
| 5,252,271 | 10/1993 | Jeffs . |
| 5,258,430 | 11/1993 | Bastioli et al. . |
| 5,292,782 | 3/1994 | Bastioli et al. . |
| 5,314,754 | 5/1994 | Knight . |
| 5,322,866 | 6/1994 | Mayer et al. . |
| 5,362,778 | 11/1994 | Famili et al. . |
| 5,384,170 | 1/1995 | Bastioli et al. . |
| 5,397,834 | 3/1995 | Jane et al. . |
| 5,409,973 | 4/1995 | Bastioli et al. . |
| 5,427,614 | 6/1995 | Wittwer et al. . |
| 5,512,090 | 4/1996 | Franke et al. . |
| 5,660,900 | 8/1997 | Andersen et al. . |
| 5,766,529 | 6/1998 | Franke et al. . |

EXTRUSION DIE FOR BIODEGRADABLE MATERIAL WITH DIE ORIFICE MODIFYING DEVICE AND FLOW CONTROL DEVICE

BACKGROUND OF THE INVENTION

This invention relates generally to the formation of shaped objects from expanded biodegradable materials, and, in particular, to an extrusion die for ultimately forming sheets of biodegradable material.

Biodegradable materials are presently in high demand for applications in packaging materials. Commonly used polystyrene ("Styrofoam" (Trademark)), polypropylene, polyethylene, and other non-biodegradable plastic-containing packaging materials are considered detrimental to the environment and may present health hazards. The use of such non-biodegradable materials will decrease as government restrictions discourage their use in packaging applications. Indeed, in some countries in the world, the use of styrofoam (trademark) is already extremely limited by legislation. Biodegradable materials that are flexible, pliable and non-brittle are needed in a variety of packaging applications, particularly for the manufacture of shaped biodegradable containers for food packaging. For such applications, the biodegradable material must have mechanical properties that allow it to be formed into and hold the desired container shape, and be resistant to collapsing, tearing or breaking.

Starch is an abundant, inexpensive biodegradable polymer. A variety of biodegradable based materials have been proposed for use in packaging applications. Conventional extrusion of these materials produces expanded products that are brittle, sensitive to water and unsuitable for preparation of packaging materials. Attempts to prepare biodegradable products with flexibility, pliability, resiliency, or other mechanical properties acceptable for various biodegradable packaging applications have generally focused on chemical or physio-chemical modification of starch, the use of expensive high amylose starch or mixing starch with synthetic polymers to achieve the desired properties while retaining a degree of biodegradability. A number of references relate to extrusion and to injection molding of starch-containing compositions.

U.S. Pat. No. 5,397,834 provides biodegradable, thermoplastic compositions made of the reaction product of a starch aldehyde with protein. According to the disclosure, the resulting products formed with the compositions possess a smooth, shiny texture, and a high level of tensile strength, elongation, and water resistance compared to articles made from native starch and protein. Suitable starches which may be modified and used according to the invention include those derived, for example, from corn including maize, waxy maize and high amylose corn; wheat including hard wheat, soft wheat and durum wheat; rice including waxy rice; and potato, rye, oat, barley, sorghum, millet, triticale, amaranth, and the like. The starch may be a normal starch (about 20–30 wt-% amylose), a waxy starch (about 0–8 wt-% amylose), or a high-amylose starch (greater than about 50 wt-% amylose).

U.S. Pat. Nos. 4,133,784, 4,337,181, 4,454,268, 5,322,866, 5,362,778, and 5,384,170 relate to starch-based films that are made by extrusion of destructurized or gelatinized starch combined with synthetic polymeric materials. U.S. Pat. No. 5,322,866 specifically concerns a method of manufacture of biodegradable starch-containing blown films that includes a step of extrusion of a mixture of raw unprocessed starch, copolymers including polyvinyl alcohol, a nucleating agent and a plasticizer. The process is said to eliminate the need of pre-processing the starch. U.S. Pat. No. 5,409,973 reports biodegradable compositions made by extrusion from destructurized starch and an ethylene-vinyl acetate copolymer.

U.S. Pat. No. 5,087,650 relates to injection-molding of mixtures of graft polymers and starch to produce partially biodegradable products with acceptable elasticity and water stability.

U.S. Pat. No. 5,258,430 relates to the production of biodegradable articles from destructurized starch and chemically-modified polymers, including chemically-modified polyvinyl alcohol. The articles are said to have improved biodegradability, but retain the mechanical properties of articles made from the polymer alone.

U.S. Pat. No. 5,292,782 relates to extruded or molded biodegradable articles prepared from mixtures of starch, a thermoplastic polymer and certain plasticizers.

U.S. Pat. No. 5,095,054 concerns methods of manufacturing shaped articles from a mixture of destructurized starch and a polymer.

U.S. Pat. No. 4,125,495 relates to a process for manufacture of meat trays from biodegradable starch compositions. Starch granules are chemically modified, for example with a silicone reagent, blended with polymer or copolymer and shaped to form a biodegradable shallow tray.

U.S. Pat. No. 4,673,438 relates to extrusion and injection molding of starch for the manufacture of capsules.

U.S. Pat. No. 5,427,614 also relates to a method of injection molding in which a non-modified starch is combined with a lubricant, texturing agent and a melt-flow accelerator.

U.S. Pat. No. 5,314,754 reports the production of shaped articles from high amylose starch.

EP published application No. 712883 (published May 22, 1996) relates to biodegradable, structured shaped products with good flexibility made by extruding starch having a defined large particle size (e.g., 400 to 1500 microns). The application exemplifies the use of high amylose starch and chemically-modified high amylose starch.

U.S. Pat. No. 5,512,090 refers to an extrusion process for the manufacture of resilient, low density biodegradable packaging materials, including loose-fill materials, by extrusion of starch mixtures comprising polyvinyl alcohol (PVA) and other ingredients. The patent refers to a minimum amount of about 5% by weight of PVA.

U.S. Pat. No. 5,186,990 reports a lightweight biodegradable packaging material produced by extrusion of corn grit mixed with a binding agent (guar gum) and water. Corn grit is said to contain among other components starch (76–80%), water (12.5–14%), protein (6.5–8%) and fat (0.5–1%). The patent teaches the use of generally known food extruders of a screw-type that force product through an orifice or extension opening. As the mixture exits the extruder via the flow plate or die, the super heated moisture in the mixture vaporizes forcing the material to expand to its final shape and density.

U.S. Pat. No. 5,208,267 reports biodegradable, compressible and resilient starch-based packaging fillers with high volumes and low weights. The products are formed by extrusion of a blend of non-modified starch with polyalkylene glycol or certain derivatives thereof and a bubble-nucleating agent, such as silicon dioxide.

U.S. Pat. No. 5,252,271 reports a biodegradable closed cell light weight loose-fill packaging material formed by extrusion of a modified starch. Non-modified starch is reacted in an extruder with certain mild acids in the presence of water and a carbonate compound to generate $CO_2$. Resiliency of the product is said to be 60% to 85%, with density less than 0.032 $g/cm^3$.

U.S. Pat. No. 3,137,592 relates to gelatinized starch products useful for coating applications produced by intense mechanical working of starch/plasticizer mixtures in an extruder. Related coating mixtures are reported in U.S. Pat. No. 5,032,337 which are manufactured by the extrusion of a mixture of starch and polyvinyl alcohol. Application of thermomechanical treatment in an extruder is said to modify the solubility properties of the resultant mixture which can then be used as a binding agent for coating paper.

Biodegradable material research has largely focused on particular compositions in an attempt to achieve products that are flexible, pliable and non-brittle. The processes used to produce products from these compositions have in some instances, used extruders. For example, U.S. Pat. No. 5,660,900 discloses several extruder apparatuses for processing inorganically filled, starch-bound compositions. The extruder is used to prepare a moldable mixture which is then formed into a desired configuration by heated molds.

U.S. Pat. No. 3,734,672 discloses an extrusion die for extruding a cup shaped shell made from a dough. In particular, the die comprises an outer base having an extrusion orifice or slot which has a substantial horizontal section and two upwardly extending sections which are slanted from the vertical. Further, a plurality of passage ways extend from the rear of the die to the slot in the face of the die. The passage way channels dough from the extruder through the extrusion orifice or slot.

Previously, in order to form clam shells, trays and other food product containers, biodegradable material was extruded as a flat sheet through a horizontal slit or linear extrusion orifice. The flat sheet of biodegradable material was then pressed between molds to form the clam shell, tray or other food package. However, these die configurations produced flat sheets of biodegradable material which were not uniformly thick, flexible, pliable and non-brittle. The packaging products molded from the flat sheets also had these negative characteristics.

As the biodegradable material exited the extrusion orifice, the biodegradable material typically had greater structural stability in a direction parallel to the extrusion flow direction compared to a direction transverse to the extrusion flow direction. In fact, fracture planes or lines along which the sheet of biodegradable material was easily broken, tended to form in the biodegradable sheet as it exited from the extrusion orifice. Food packages which were molded from the extruded sheet, also tended to break or fracture along these planes.

Therefore, there is a need for a process which produces a flexible, pliable and non-brittle biodegradable material which has structural stability in both the longitudinal and transverse directions

SUMMARY OF THE INVENTION

According to one aspect of the present invention, there is provided a extrusion die through which biodegradable material can be extruded which has structural stability in both the longitudinal and transverse directions of the material, which has a flow control device which controls flow of biodegradable material through the extrusion die, and which allows the inner and outer walls of the extrusion orifice to be adjusted relative to each other to modify the circumferential wall thickness of the cylindrical extrudate.

According to one embodiment of the invention, the die extrudes a tubular shaped structure which has its greatest structural stability in a direction which winds helically around the tubular structure. Thus, at the top of the tubular structure, the direction of greatest stability twists in one direction while at the bottom the direction of greatest stability twists in the opposite direction. This tubular structure is then pressed into a sheet comprised of two layers having their directions of greater stability approximately normal to each other. This 2-ply sheet is a flexible, pliable and non-brittle sheet with strength in all directions.

According to another embodiment of the present invention, the flow rate of the biodegradable material is regulated at a location upstream from the orifice and at the orifice itself to provide complete control of extrusion parameters. In particular, the head pressure of the biodegradable material behind the extrusion orifice is controlled to produce an extrudate having desired characteristics.

According to a further embodiment of the invention, an annular extrusion die allows the inner and outer walls of the extrusion orifice to be adjusted relative to each other to modify the circumferential wall thickness of the cylindrical extrudate.

According to one aspect of the present invention, there is provided an extrusion die for extruding biodegradable material, the extrusion die comprising: a mandrel; an outer member positioned near the mandrel; an extrusion orifice between the mandrel and the outer member; a member in communication with at least one defining member of the extrusion orifice, wherein the member is capable of producing relative movement between the outer member and the mandrel, wherein the relative movement has a component transverse to an extrusion direction of biodegradable material through the extrusion orifice; a flow control device which controls flow of biodegradable material through the extrusion die; and a positioning device which positions the outer member and the mandrel relative to each other.

According to another aspect of the invention, there is provided an extrusion die for extruding biodegradable material, the extrusion die comprising: a cylindrical mandrel; a cylindrical outer ring positioned around the mandrel; an annular extrusion orifice between the mandrel and the outer ring; a member in communication with at least one defining member of the annular extrusion orifice which produces angular relative movement between the outer ring and the mandrel; a flow control device which controls flow of biodegradable material through the extrusion die, wherein the flow control device comprises a mechanism which translates the outer ring to adjust the width of the annular extrusion orifice; and a positioning device which positions the outer ring and the mandrel relative to each other.

According to a further aspect of the invention, there is provided an extrusion die for extruding biodegradable material, the extrusion die comprising: a mandrel; an outer member positioned near the mandrel; an extrusion orifice between the mandrel and the outer member; a mounting plate having a flow bore which conducts biodegradable material toward the extrusion orifice, wherein the mandrel is fixedly mounted to the mounting plate and the outer member is movably mounted to the mounting plate; a shearing member which moves the outer member relative to the mandrel in a direction having a component transverse to an extrusion direction of biodegradable material through the extrusion orifice; a flow control device which controls flow of biodegradable material through the extrusion die, wherein the flow control device comprises a flow control channel upstream of the extrusion orifice, wherein the flow control channel throttles flow of the biodegradable material through the die, wherein the mandrel is attached to the mounting plate with at least one spacer between, wherein the mounting plate and the mandrel define the flow control channel; and a positioning device which positions the outer member and the mandrel relative to each other, wherein the positioning device comprises a shifting device for moving the outer member and the mandrel relative to each other and a fixing device which fixes the relative positions of the outer member and the mandrel.

According to another aspect of the invention, there is provided an improved process for the extrusion of biodegradable material wherein the extrusion comprises flowing the biodegradable material in a flow direction through an orifice, the improvement comprising: moving or shearing the biodegradable material, in a direction having a component transverse to the flow direction, during extrusion; controlling the flow rate of biodegradable material through the extrusion die during extrusion, wherein the controlling comprises adjusting the head pressure of the biodegradable material in the extrusion die and adjusting at least one cross-sectional area of a biodegradable material flow path within the extrusion die; and modifying the orifice geometry.

According to another aspect of the invention, there is provided a process for manufacturing biodegradable shaped products of increased strength, the process comprising: extruding a biodegradable material, wherein the extruding comprises moving the biodegradable material in a first direction through an orifice to produce an extrudate; modifying the orifice geometry; shearing the biodegradable material, in a second direction having a component transverse to the first direction, during the extruding; controlling the flow rate of biodegradable material through the extrusion die during the extruding, wherein the controlling comprises adjusting the cross-sectional area of an extrusion orifice and wherein the controlling further comprises adjusting the cross-sectional area of a biodegradable material flow path at a location upstream of the extrusion orifice; compressing the extrudate; and molding the compressed extrudate of biodegradable material into a structure.

BRIEF DESCRIPTION OF THE DRAWINGS

The present invention is better understood by reading the following description of non-limitative embodiments, with reference to the attached drawings wherein like parts in each of the several figures are identified by the same reference character, and which are briefly described as follows.

It is to be noted, however, that the appended drawings illustrate only typical embodiments of this invention and are therefore not to be considered limiting of the inventions scope, as the invention may admit to other equally effective embodiments.

DETAILED DESCRIPTION OF THE INVENTION

Figure 1:
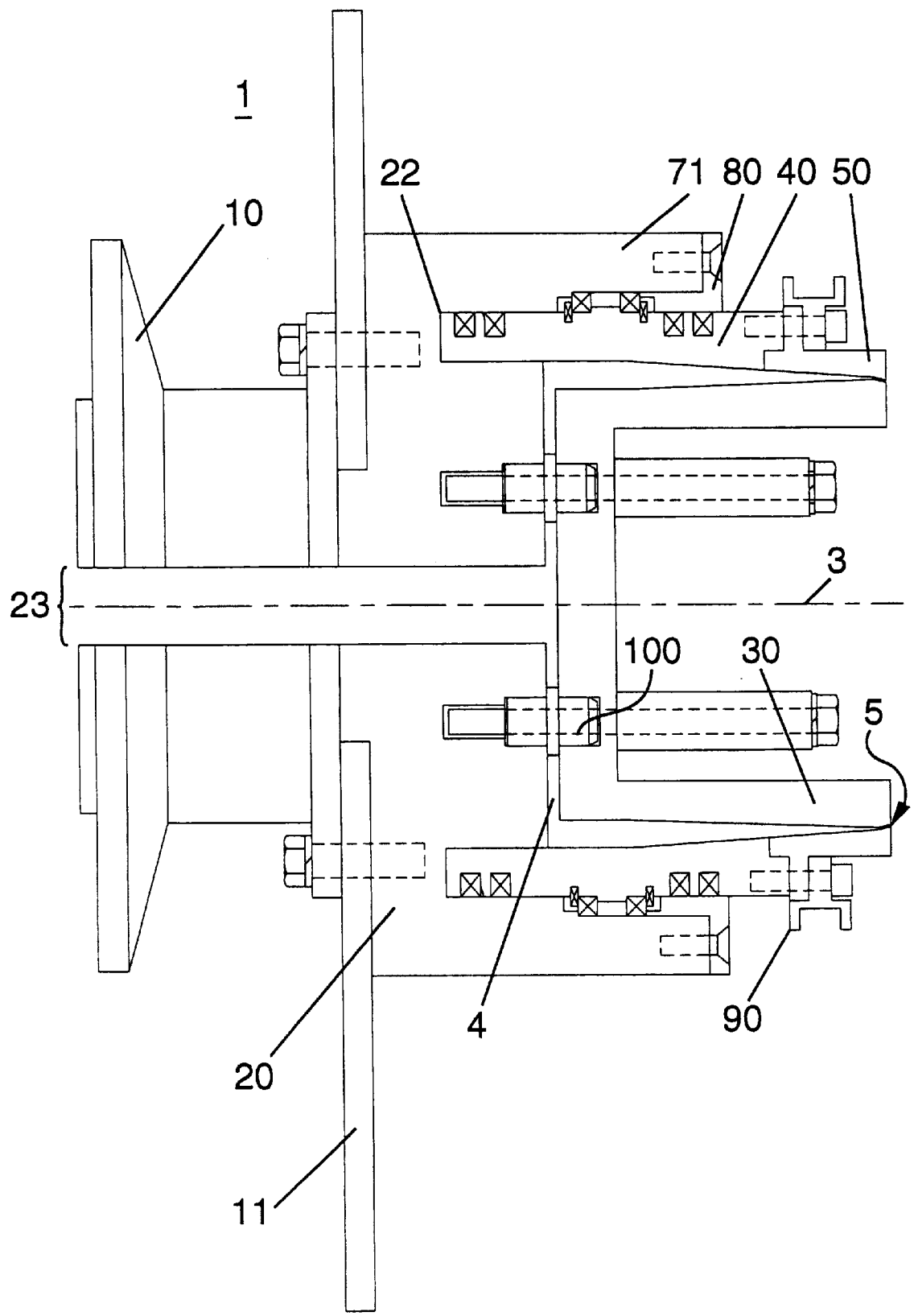
FIG. 1 is a cross-sectional view of an embodiment of the invention fully assembled.

Referring to FIG. 1, a cross-section view of an embodiment of the invention is shown. The die 1 is made up of several discrete annular members which share the same longitudinal central axis 3. A mounting plate 20 is located in the center of the die 1 and is the member to which most of the remaining parts are attached. At one end of the mounting plate 20, an extruder adapter 10 is attached for connecting the die 1 to an extruder (not shown). A backplate 11 is attached between the extruder adapter 30 and the mounting plate 20. At an end opposite to the extruder adapter 10, several spacers 100 are positioned in counter sunk holes in the mounting plate 20 at various locations equidistant from the longitudinal central axis 3. A mandrel 30 has counter sunk holes which correspond to those in the mounting plate 20. The mandrel 30 is fixed to the mounting plate 20 with the spacers 100 between, the spacers being inserted into the respective counter sunk holes. On the same side of the mounting plate 20 as the mandrel 30, a seal ring 40 is inserted into an annular spin channel 22 of the mounting plate 20. At the periphery of the mounting plate 20, the mounting plate 20 has a bearing portion 71 which extends around the seal ring 40. An end cap 80 is attached to the distal end of the bearing portion 71 of the mounting plate 20 to lock the seal ring 40 in the spin channel 22. An outer ring 50 is attached to the seal ring 40 around the outside of the mandrel 30 to form an extrusion orifice 5 between the outer ring 50 and the mandrel 30. Finally, a die wheel 90 is attached to the outer ring 50. As described more fully below, a motor and drive system drive the die wheel 90 to rotate the outer ring 50 about the mandrel 30.

Biodegradable material is pushed through the die 1 under pressure by an extruder (not shown) which is attached to the extruder adapter 10. The biodegradable material passes through flow bore 23 which conducts the material through the extruder adapter 10 and the mounting plate 20 to a central location at the backside of the mandrel 30. The biodegradable material is then forced radially outward through a disc-shaped cavity called a flow control channel 4 which is defined by the mounting plate 20 and the mandrel 30. From the flow control channel 4, the biodegradable material is pushed through the extrusion orifice 5 defined by the mandrel 30 and the outer ring 50. According to one embodiment of the invention, the biodegradable material is forced through the extrusion orifice 5, the die wheel 90, outer ring 50 and seal ring 40 are rotated relative to the stationary mounting plate 20 and mandrel 30.

Figure 2:
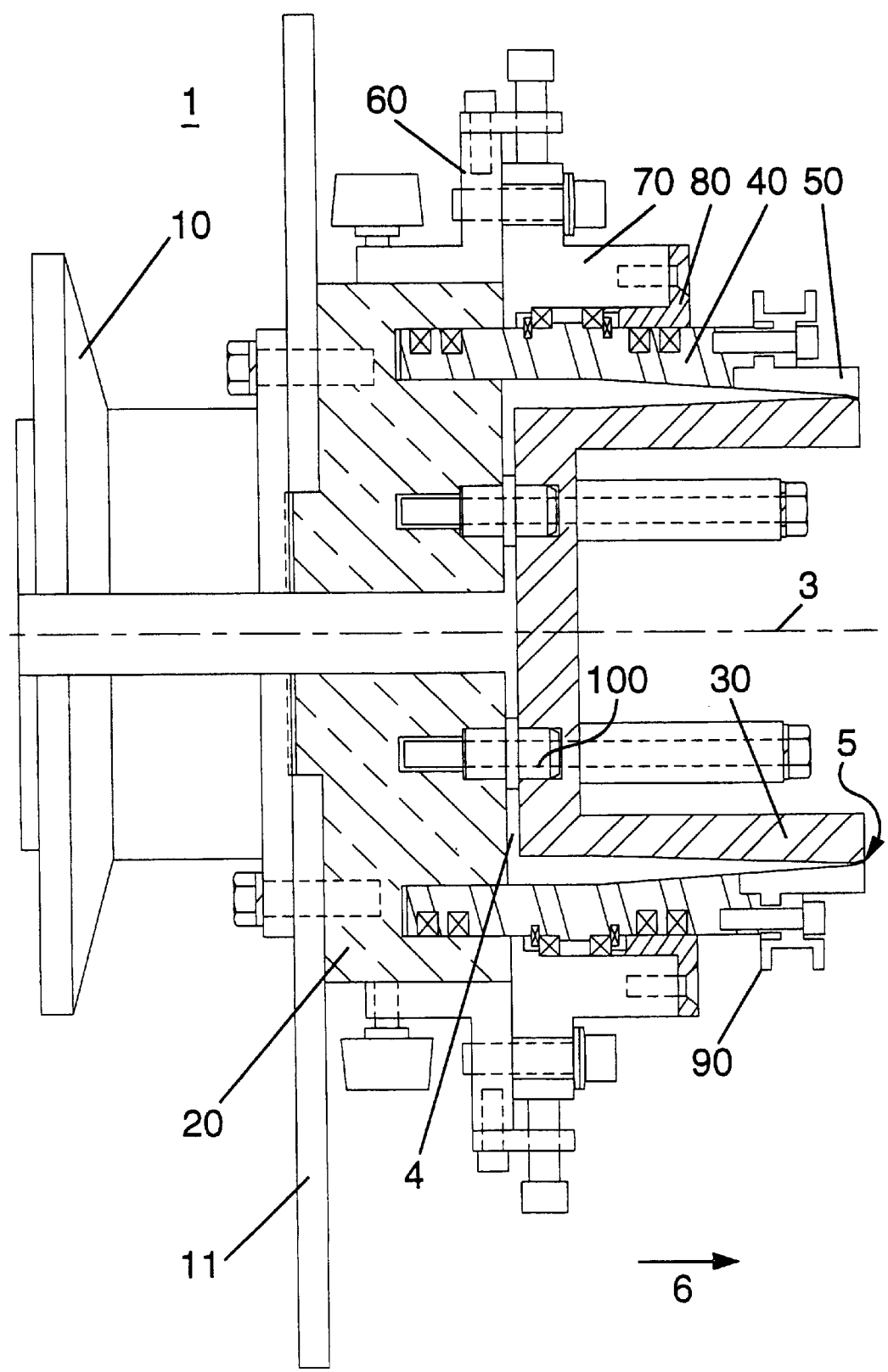
FIG. 2 is a cross-sectional view of an embodiment of the die fully assembled with centering and flow control devices.
Figure 3:
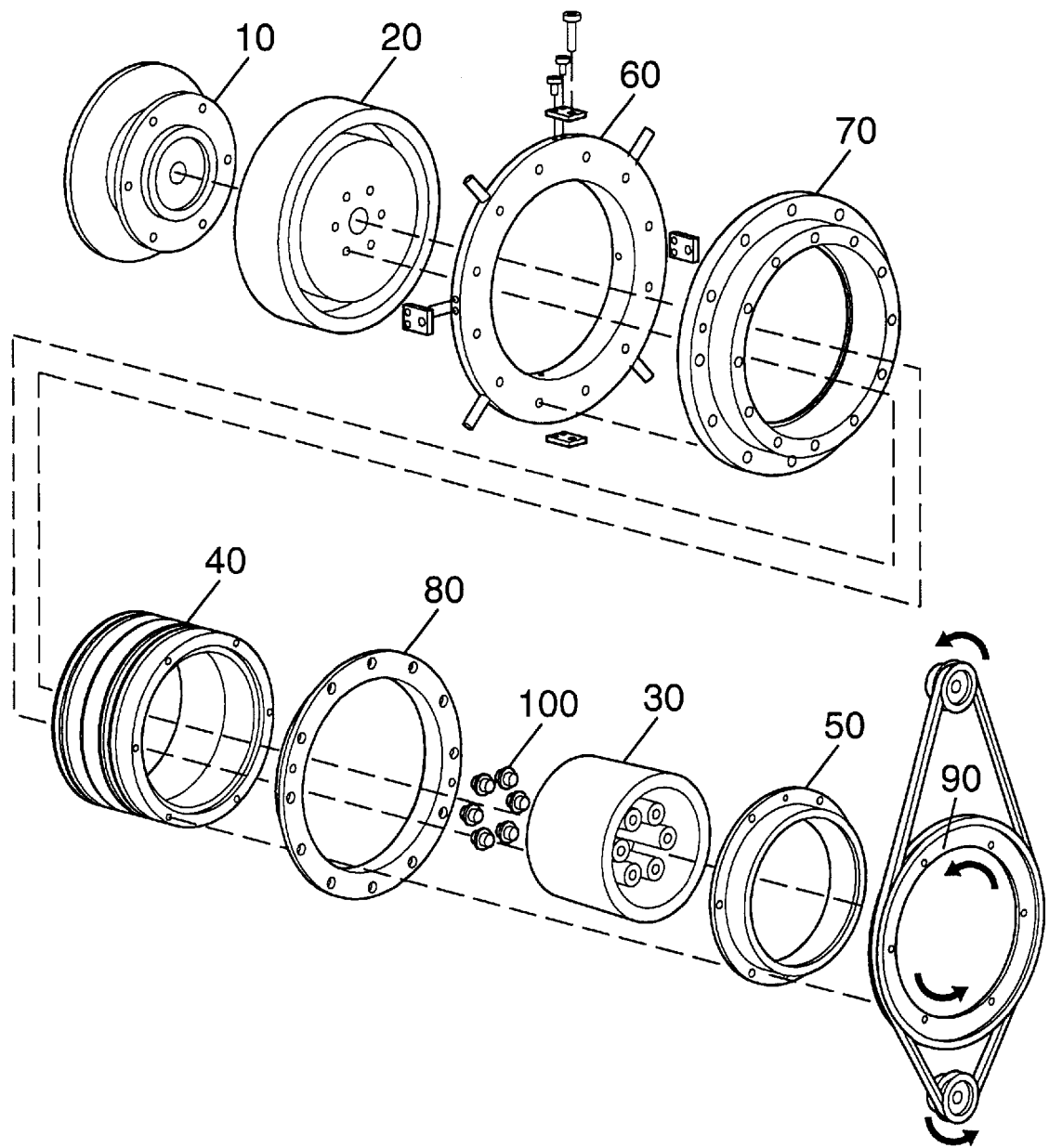
FIG. 3 is an exploded perspective view of the several parts which comprise the die shown in FIG. 2.

Referring to FIGS. 2 and 3, cross-sectional and exploded views, respectively, of an embodiment of the invention with orifice shifting and flow control devices are shown. The die 1 is made up of several discrete annular members which share the same longitudinal central axis 3. A mounting plate 20 is located in the center of the die 1 and is the member to which most of the remaining parts are attached. At one end of the mounting plate 20, an extruder adapter is attached for connecting the die 1 to an extruder (not shown). A gap adjusting ring 60 is placed concentrically around the cylindrical exterior of the mounting plate 20. A bearing housing 70 lies adjacent the gap adjusting ring 60 and the mounting plate 20. A seal ring 40 is placed within the bearing housing 70 and is inserted into an annular spin channel of the mounting plate 20. At an end opposite to the extruder adapter 10, several spacers 100 are positioned in counter sunk holes in the mounting plate 20 at various locations equidistant from the longitudinal central axis 3. A mandrel 30 has counter sunk holes which correspond to those in the mounting plate 20. The mandrel is fixed to the mounting plate 20 with the spacers 100 between. An outer ring 50 is attached to the seal ring 40 around the outside of the mandrel 30 to form an extrusion orifice 5 between the outer ring 50 and the mandrel 30. Finally, a die wheel 90 is attached to the outer ring 50 for rotating the outer ring 50 about the mandrel 30.

Figure 4:
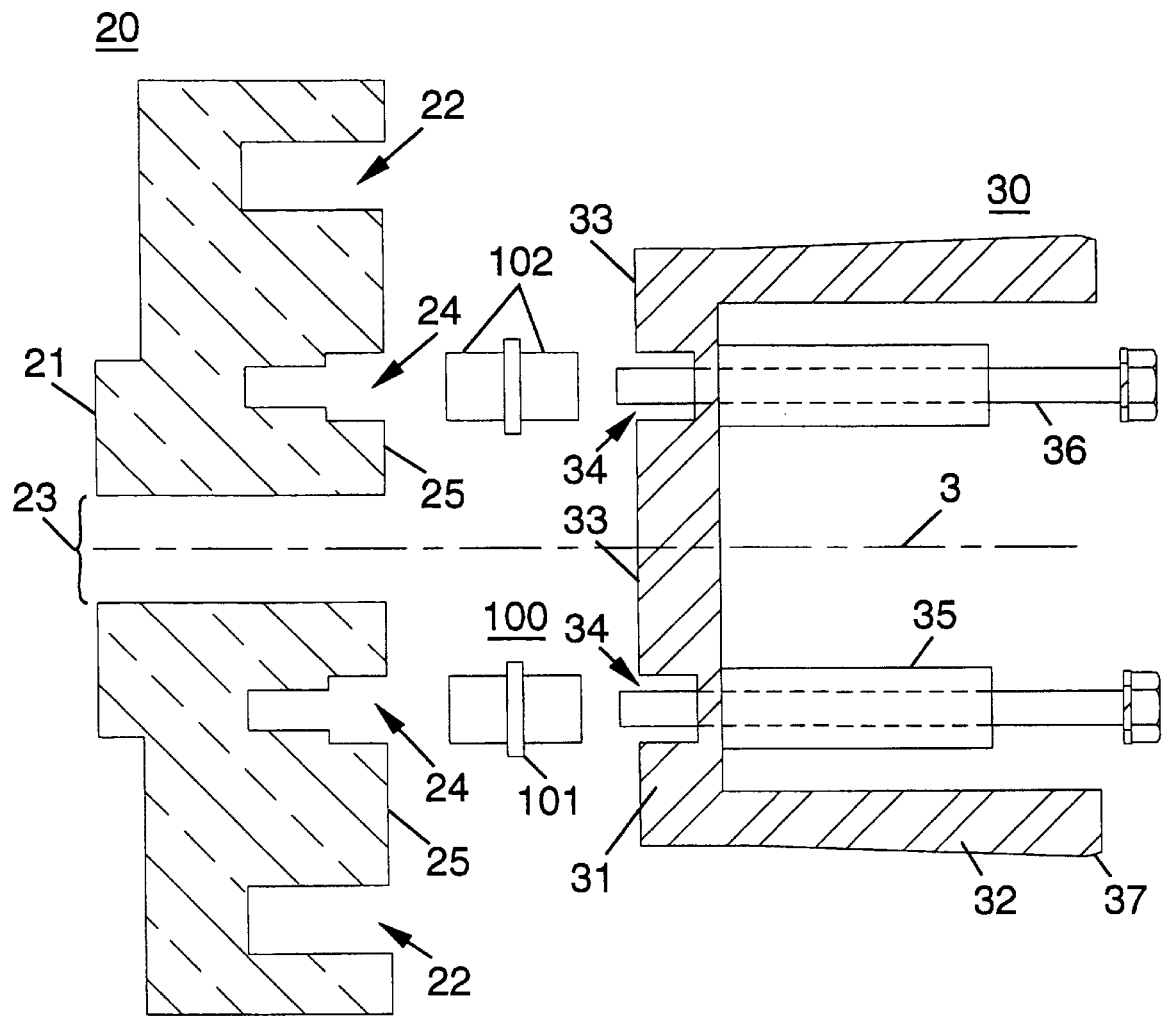
FIG. 4 is a cross-sectional exploded view of a mandrel, mounting plate and spacers.

Referring to FIG. 4, a cross section of the mounting plate 20, spacers 100 and the mandrel 30 are shown disassembled. The mounting plate 20 is basically a solid cylinder with a cylindrical flow bore 23 cut in the middle along the longitudinal central axis 3. One end of the mounting plate 20 comprises a mounting shoulder 21 for engagement with the extruder adapter 10 (shown in FIGS. 2 and 3). Opposite the mounting shoulder 21, the mounting plate 20 has a annular spin channel 22 for receiving the seal ring 40 (shown in FIGS. 2 and 3). Between the cylindrical flow bore 23 at the center and the spin channel 22, the mounting plate 20 has a disc-shaped flow surface 25. The mounting plate 20 also has several mounting plate counter sunk holes 24 for receiving spacers 100 such that the counter sunk holes 24 are drilled in the flow surface 25. In FIG. 4, only two counter sunk holes 24 are shown because the view is a cross section along a plane which intersects the longitudinal central axis 3. All of the mounting plate counter sunk holes 24 are equidistant from each other and from the longitudinal central axis 3.

According to one embodiment of the invention, the mandrel 30 is a bowl shaped structure having a base 31 and sides 32. As shown in FIG. 4, the mandrel 30 is oriented sideways so that the central axis of the mandrel is collinear with the longitudinal central axis 3 of the die. Unlike the mandrel 30, which has a flow bore 23 through the center, the mandrel 30 has a solid base 31. The outside surface of the base 31 is a base flow surface 33. The mandrel 30 has several counter-sunk holes 34 which are cut in the base flow surface 33. In FIG. 4, only two mandrel countersunk holes 34 are shown because the view is a cross-section along a plane which intersects the longitudinal central axis 3. All of the mandrel countersunk holes 34 are equidistant from each other and from the central axis 3. The inside of the mandrel 30 is hollowed out to reduce its overall weight.

Spacers 100 are used to mount the mandrel 30 to the mounting plate 20. Each of the spacers 100 comprise male ends 102 for insertion into mounting plate and mandrel countersunk holes 24 and 34. Of course, the outside diameter of the male ends 102 is slightly smaller than the inside diameters of mounting plate and mandrel countersunk holes 24 and 34. Between the male ends 102, each of the spacers 100 comprise a rib 101 which has an outside diameter larger than the inside diameters of the mounting plate and mandrel countersunk holes 24 and 34. The rib 101 of each spacer 100 has a uniform thickness in the longitudinal direction to serve as the spacer mechanism between the assembled mounting plate and mandrel.

The mandrel 30 is attached to the mounting plate 20 with mandrel bolts 36. The mandrel bolts 36 extend through the base 31 of the mandrel 30, through the spacers 100 and into treaded portions in the bottom of the mounting plate counter sunk holes 24. While the heads of the mandrel bolts 36 could be made to rest firmly against the inside of the base 31 of the mandrel, in the embodiment shown, the mandrel bolts extend through risers 35 so that the heads of the mandrel bolts 36 are more accessible from the open end of the mandrel 30. In this embodiment, one end of each of the risers 35 rests securely against the inside of the mandrel base 31 while the other end of each riser is engaged by the head of a mandrel bolt 36.

Figure 5:
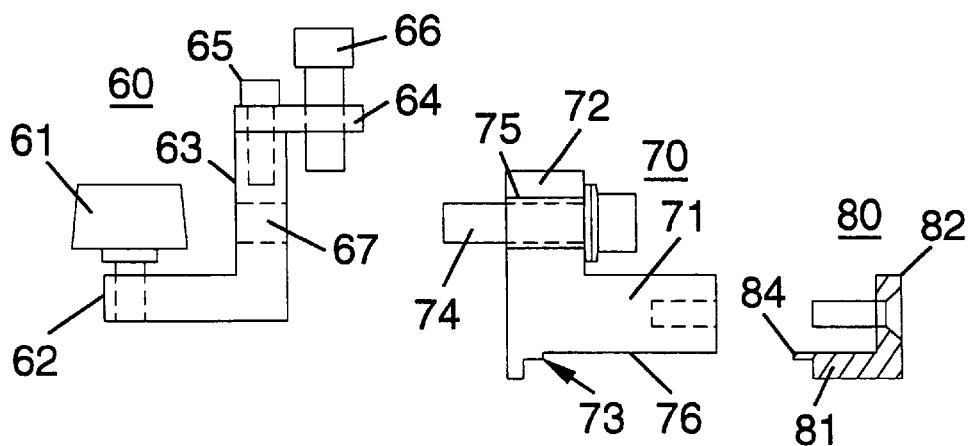
FIG. 5 is a cross-sectional exploded view of a gap adjusting ring, a bearing housing and an end cap.
Figure 5:
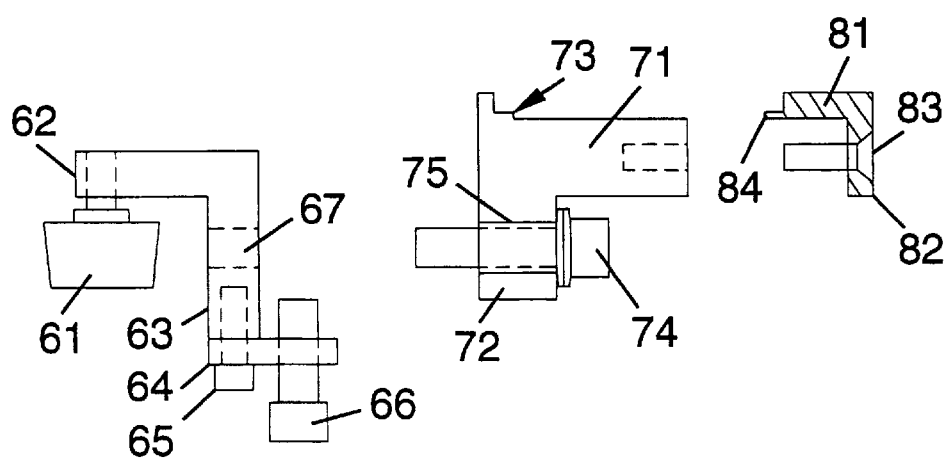

Referring to FIG. 5, a cross-sectional view of the gap adjusting ring 60, the bearing housing 70, and the end cap 80 are shown disassembled. The gap adjusting ring 60 is a ring shaped member having a longitudinal central axis 3 and an inner diameter slightly greater than the outside diameter of the mounting plate 20 (shown in FIGS. 2 and 3). The gap adjusting ring 60 also has several lock screws 61 which extend through an inner portion 62 of the gap adjusting ring 60 for engagement with the mounting plate 20 once the gap adjusting ring 60 is placed around the outside of the mounting plate 20. Also, the gap adjusting ring 60 has an outer portion 63 for engagement with the bearing housing 70. At the outer edge of the outer portion 63, the gap adjusting ring 60 has shifting lugs 64 which are attached via lug bolts 65. In the embodiment shown, four shifting lugs 64 are attached to the outer portion 63 of the gap adjusting ring 60. The shifting lugs 64 are spaced around the gap adjusting ring 60 so that one is at the top, bottom, and sides, respectively. The shifting lugs 64 extend from the outer portion 63 in a longitudinal direction for positioning engagement with the bearing housing 70. The shifting bolts 66 poke through the shifting lugs 64 in the part of the shifting lugs 64 which extend from the outer portion 63 in the longitudinal direction. The shifting bolts 66 poke through in a direction from outside the die toward the longitudinal central axis 3. Finally, the gap adjusting ring 60 has threaded holes 67 at various locations around the outer portion 63 for receiving screws 74.

The bearing housing 70 is an annular ring which has a longitudinal central axis 3. The bearing housing 70 has a bearing portion 71 and a support portion 72. The support portion 72 is annular with is greatest cross-section in a direction transverse to the longitudinal central axis 3. The bearing housing 70 is attachable to the gap adjusting ring 60 by the support portion 72 which engages the outer portion 63 of the gap adjusting ring 60. In the embodiment shown, this engagement between the bearing housing 70 and the gap adjusting ring 60 is accomplished by screws 74 between these two members. The support portion 72 has several slip holes 75 which protrude through the support portion 72 in a longitudinal direction. In one embodiment, twelve slip holes 75 are positioned equidistant from each other around the support portion 72 and are positioned equidistant from the longitudinal central axis 3. The inside diameter of each slip hole 75 is larger than the outside diameter of screws 74 so that there is substantial "play" between the screws 74 and the slip holes 75. While the slip holes 75 are larger than the screws 74, the slip holes 75 are small enough so that the heads of the screws 74 securely engage the support portion 72 of the bearing housing 70.

The other major part of the bearing housing 70 is the bearing portion 71 which is an annular section having its greatest thickness in the longitudinal direction. The interior surface of the bearing portion 71 is a bearing surface 76 for engaging lateral support bearings 42 (shown in FIG. 6). The bearing surface 76 supports the lateral support bearings 42 in a plane normal to the longitudinal central axis 3. Protruding from the bearing surface 76 near the support portion 72, the bearing housing 70 has a bearing housing lateral support flange 73 which supports a lateral support bearing 42 of the seal ring 40 (shown in FIG. 6).

When the bearing housing 70 is attached to the gap adjusting ring 60, the relative positions of the two devices may be adjusted. In particular, during assembly, the shifting bolts 66 of the gap adjusting ring 60 are relaxed to provide enough space for the support portion 72 of the bearing housing 70. The bearing housing 70 is then placed directly adjacent the gap adjusting ring 60 with the support portion 72 within the extended portions of shifting lugs 64. The screws 74 are then inserted through the slip holes 75 and loosely screwed into threaded holes 67 in the gap adjusting ring 60. The shifting bolts 66 are then adjusted to collapse on the support portion 72 of the bearing housing 70. The shifting bolts 66 may be adjusted to push the bearing housing 70 off center relative to the gap adjusting ring 60. Because the slip holes 75 are larger than the screws 74, the shifting bolts 66 freely push the bearing housing 70 in one direction or the other. By varying the pressure of the shifting bolts 66 against the outer surface of the bearing housing 70, the bearing housing 70, seal ring 40 and outer ring 50 may be perturbed from their original positions to more desirable positions. Once the desired relative position of the bearing housing 70 to the gap adjusting ring 60 is obtained, the screws 74 are tightened to firmly attach the two members.

The end cap 80 is preferably a ring which has a longitudinal central axis 3. The interior portion of the end cap 80 is a stabilizer 81 and the exterior is a fastener flange 82. Fastener holes 83 are drilled in the fastener flange 82 for inserting fasteners which secure the end cap 80 to the bearing portion 71 of the bearing housing 70. The outside diameter of the stabilizer 81 of the end cap 80 is slightly smaller than the inside diameter of the bearing portion 71 of the bearing housing 70. This allows the stabilizer 81 to be inserted into the bearing portion 71. At the distal end of the stabilizer 81, there is an end cap lateral support flange 84 which supports a lateral support bearing 42 (shown in FIG. 6). Therefore, when the end cap 80 is securely fastened to the bearing housing 70, the bearing housing lateral support flange 73 and the end cap lateral support flange 84 brace the lateral support bearings 42 (shown in FIG. 6) against movement in the longitudinal directions.

Figure 6:
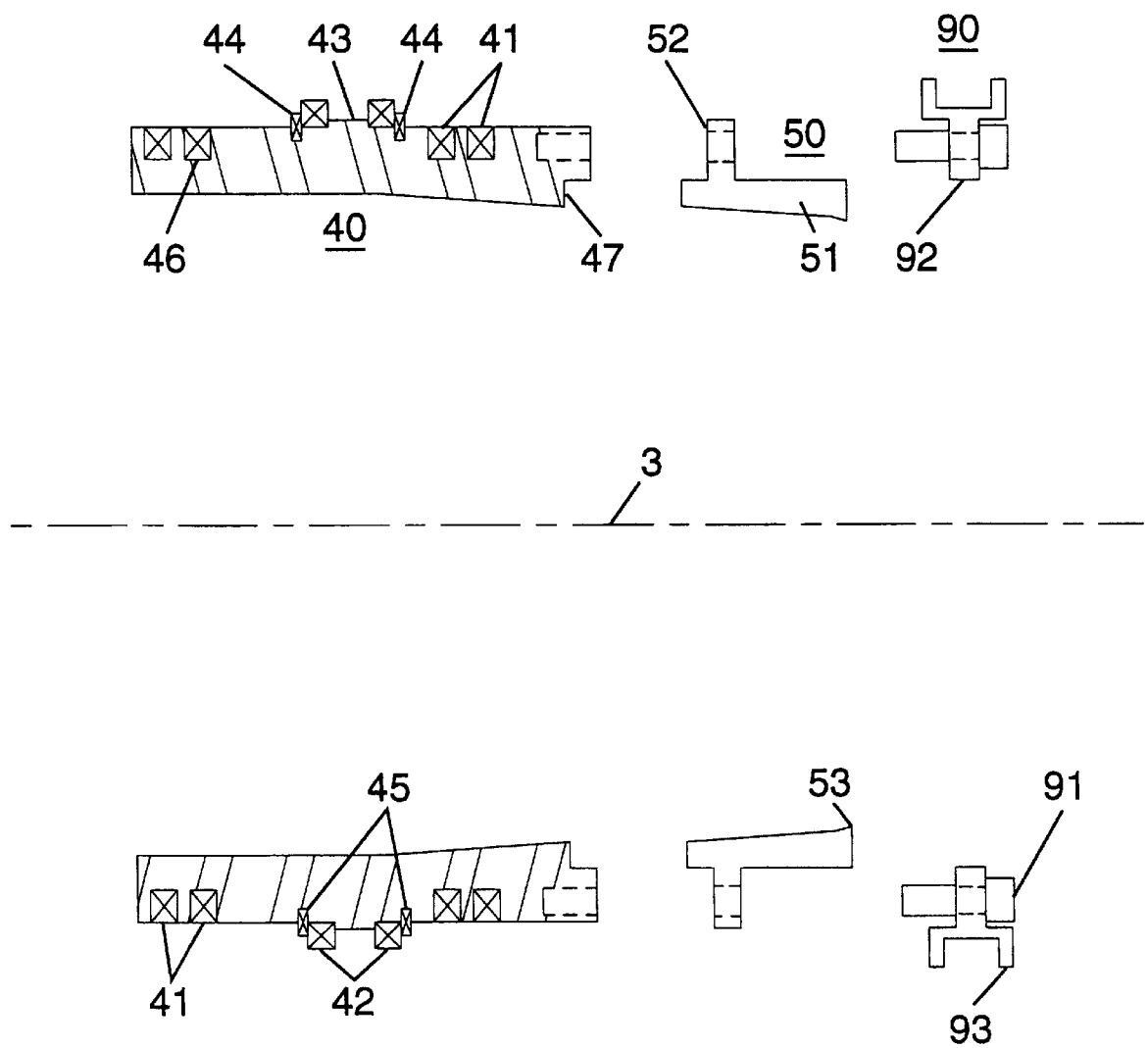
FIG. 6 is an exploded cross-sectional view of a seal ring, an outer ring and a die wheel.

Referring to FIG. 6, a cross-sectional view of the seal ring 40, the outer ring 50 and the die wheel 90 are shown disassembled. The seal ring 40 is a cylindrical member having a longitudinal central axis 3. The seal ring 40 has an interior diameter which decreases from one end to the other. At the end of the seal ring 40 which has the smallest inside diameter, the seal ring 40 has a notch 47 for engaging the outer ring 50 as discussed below. On the outside of the seal ring 40, there are four superior piston rings 41 for engaging the mounting plate 20 and the end cap 80 (both shown in FIGS. 2 and 3). The seal ring 40 also comprises two lateral support bearings 42. The lateral support bearings 42 are separated by a bearing spacer flange 43 which is positioned between the two lateral support bearings 42. The seal ring 40 further comprises two retaining rings 44 which are positioned on the outsides of the lateral support bearings 42. Thus, the seal ring 40 is assembled by slipping one of the lateral support bearings 42 over each end of the seal ring 40 until they are each adjacent opposite sides of the bearing spacer flange 43. Next, retaining rings 44 are slipped over each end of the seal ring 40 until they snap into grooves 45 at the outsides of the lateral support bearings 42. Thus, the lateral support bearings 42 are secured between the bearing spacer flange 43 and the retaining rings 44. Finally, the superior piston rings 41 are placed in piston slots 46.

The outer ring 50 is a cylindrical member having a longitudinal central axis 3. The outer ring 50 has a ring portion 51 and a fastener flange 52. Longitudinal holes are cut through the fastener flange 52 for inserting fasteners which secure the outer ring 50 to an end of the seal ring 40. The outside diameter of the ring portion 51 is slightly smaller than the inside diameter of the notch 47 of the seal ring 40. This allows the outer ring 50 to be assembled to the seal ring 40 by inserting the ring portion 51 into the notch 47. The inside diameter of the ring portion 51 tapers from the end which attaches to the seal ring 40 to the other. At the end of the ring portion 51 having the smallest inside diameter, the outer ring 50 comprises a lip 53 which defines one side of the extrusion orifice 5 (shown in FIG. 2).

The die wheel 90 is a cylindrical member with a wheel flange 92 and a drive section 93. Holes are drilled through the wheel flange 92 for inserting wheel fasteners 91 which secure the die wheel 90 and the outer ring 50 to the seal ring 40. The drive section 93 is a device which engages a drive mechanism for rotating the die wheel 90. In the embodiment shown in the figure, the drive section is a pulley for engaging a drive belt.

Assembly of the complete die 1 is described with reference to FIGS. 2 and 3. First, the extruder adapter 10 is secured to the mounting plate 20 with a back plate 11 between. Next, with further reference to FIG. 4, several spacers 100 are placed in the mandrel 30 by inserting a male end 102 of each spacer 100 into a mandrel counter sunk hole 34, until all the mandrel counter sunk holes 34 have a spacer 100. The mandrel 30 is then placed adjacent the mounting plate 20 with the protruding male ends 102 of the spacers 100 being inserted into the mounting plate counter sunk holes 24. The mandrel 30 is then attached to the mounting plate 20 with spacers 100 between the mandrel bolts 36. In particular, the risers 35 are slipped over the shanks of the mandrel bolts 36 and the mandrel bolts 36 are inserted through the mandrel base 31, the mandrel counter sunk holes 34, the spacers 100, and the mounting plate counter sunk holes 24. The bottoms of the mounting plate counter sunk holes 24 are threaded so that the mandrel bolts 36 may be screwed into the mounting plate 20. The mandrel bolts 36 are then screwed into the threaded bottoms of each mounting plate counter sunk hole 24 to fasten the mandrel 30 to the mounting plate 20. With further reference to FIG. 5, the gap adjusting ring 60 is slipped over the exterior of the mounting plate 20. The lock screws 61 are then tightened against the exterior of the mounting plate 20. The bearing housing 70 is then positioned with the support portion 72 against the outer portion 63 of the gap adjusting ring 60. The shifting bolts 66 are adjusted to center the bearing housing 70 about the longitudinal central axis 3 and the screws inserted through slip holes 75 and tightened into the threaded holes 67 of the gap adjusting ring 60. Next, with further reference to FIG. 6, the seal ring 40 having superior piston rings 41, lateral support bearings 42 and retaining rings 44 attached thereto, is rotatably attached to the bearing housing 70. In particular, the seal ring 40 is inserted into the bearing housing 70 and then into the spin channel 22 of the mounting plate 20. The seal ring 40 is pushed all the way into the spin channel 22 of the mounting plate 20 until the first of the lateral support bearings 42 rests firmly against the bearing housing lateral support flange 73. In this position, two of the four superior piston rings 41 form a seal between the seal ring 40 and the spin channel 22 of the mounting plate 20. The seal ring 40 is held in this position by inserting the stabilizer 81 of the end cap 80 into the bearing portion 71 of the bearing housing 70. The end cap 80 is pushed all the way into the bearing housing 70 until the end cap lateral support flange 84 contacts the second of the lateral support bearings 42 of the seal ring 40. Once in place, the end cap 80 is fixed to the bearing housing 70 by inserting fasteners through the fasteners holes 83 of the fastener flange 82 and into the bearing portion 71 of the bearing housing 70. The interior surface of the stabilizer 81 of the end cap 80 engages the remaining two superior pistons rings 41 of the seal ring 40 so that the seal ring 40 is completely stabilized and allowed to spin freely about the longitudinal central axis 3. With the end cap 80 securely fastened to the bearing housing 70, the seal ring 40 is securely fastened in the lateral direction between the lateral support flanges 73 and 84. With the seal ring 40 securely in place, the outer ring 50 and die wheel 90 are then attached to the end which protrudes from the mounting plate 20. In particular, the ring portion 51 of the outer ring 50 is inserted into the notch 47 of the seal ring 40 and the wheel flange 91 of the die wheel 90 is positioned adjacent the fastener flange 52 of the outer ring 50. Wheel fasteners 91 are then inserted through the wheel flange 92 and the fastener flange 52 and locked into the seal ring 40.

Once assembled, both the extruder adapter 10 and the mounting plate 20 further comprise a flow bore 23 which extends from the extruder (not shown) to the flow surface 25, as shown in FIGS. 2 and 4. Thus, the die 1 operates such that biodegradable extrudate material is pushed by the extruder through the flow bore 23 until it reaches the base flow surface 33 of the mandrel 30. The biodegradable extrudate then flows radially outward around the spacers 100 between the flow surface 25 of the mounting plate 20 and the base flow surface 33 of the mandrel 30. This disc-like space between the mounting plate 20 and the mandrel 30 is the flow control channel 4. From the flow control channel 4, the biodegradable extrudate then enters a cylindrical space between the seal ring 40 and the mandrel 20 and is pushed through this space toward the extrusion orifice 5 between the mandrel 30 and the outer ring 50. As the biodegradable extrudate moves toward the extrusion orifice 5, the die wheel 90 is rotated to rotate the outer ring 50 and seal ring 40 around the stationary mandrel 30. Thus, the biodegradable extrudate is twisted by the rotating outer ring 50. As the extrudate exits the extrusion orifice 5, a tubular product of twisted biodegradable material is produced. As described fully below, because the seal ring 40 is rotatably mounted within the bearing housing 70, the seal ring 40 may be made to rotate about the mandrel 30 as the extrudate is pushed through the orifice 5.

Flow of the biodegradable material through the die 1 is controlled in two ways: (1) adjusting the width of the flow control channel 4, and (2) controlling the size of the extrusion orifice 5. Regarding the flow control channel 4, as noted above, biodegradable material is passed from the extruder through a flow bore 23 in the mounting plate 20 until it reaches the base flow surface 33 of the mandrel 30. From the central location, the biodegradable material is pushed radially outward between the base flow surface 33 of the mandrel 30 and the flow surface 25 of the mounting plate 20. Of course, as the biodegradable material flows between the surfaces through the flow control channel 4, it passes around each of the spacers 100 which separate the mandrel 30 and the mounting plate 20. The width of the flow control channel 4 is adjusted by using spacers which have larger or smaller ribs 101 (See FIG. 4). In particular, if it is desirable to decrease flow of the biodegradable material through the flow control channel 4, spacers 100 having ribs 101 which are relatively thin in the longitudinal direction are inserted between the mounting plate 20 and the mandrel 30. Alternatively, if it is desirable to increase a flow rate of biodegradable material through the flow control channel 4, spacers 100 having ribs 101 with relatively larger thicknesses in the longitudinal direction are inserted between the mounting plate 20 and the mandrel 30. Therefore, in a preferred embodiment, the die 1 has several sets of spacers 100 which may be placed between the mounting plate 20 and the mandrel 30 to control the width of the flow control channel 4.

Additionally, flow of the biodegradable material through the extrusion orifice 5 is controlled by altering the width of the extrusion orifice 5. The thickness of the extrusion orifice 5 between the mandrel lip 37 and the outer ring lip 53 is adjusted by sliding the gap adjusting ring 60, the bearing housing 70, the seal ring 40, and the outer ring 50 along the longitudinal central axis 3 out away from the stationary mandrel 30. Since the interior diameter of the ring portion 51 of the outer ring 50 is tapered from the end which attaches to the seal ring 40, the outer ring 50 has its smallest interior diameter at the outer ring lip 53. To produce a biodegradable extrudate with a very thin wall thickness, the gap adjusting ring 60 is pushed all the way onto the mounting plate 20 until the outer ring lip 53 is directly opposite the mandrel lip 37. To produce a thicker biodegradable extrudate, the gap adjusting ring 60 is moved slightly away from the mounting plate 20 along the longitudinal central axis 3 in the direction of direction arrow 6 (shown in FIG. 2), so that the outer ring lip 53 is positioned beyond the mandrel lip 37. Thus, a wider section of the ring portion 51 is adjacent the lip 37 of the mandrel 30 so that the extrusion orifice 5 is thicker. Once the desired orifice size is obtained, lock screws 61 are screwed into the gap adjusting ring 60 to re-engage the mounting plate 20. This locks the gap adjusting ring 60, the bearing housing 70, the seal ring 40, and the outer ring 50 in place to ensure the thickness of the extrusion orifice 5 remains constant during operation. A thicker extrusion orifice 5 increases flow through the die.

Figure 7A:
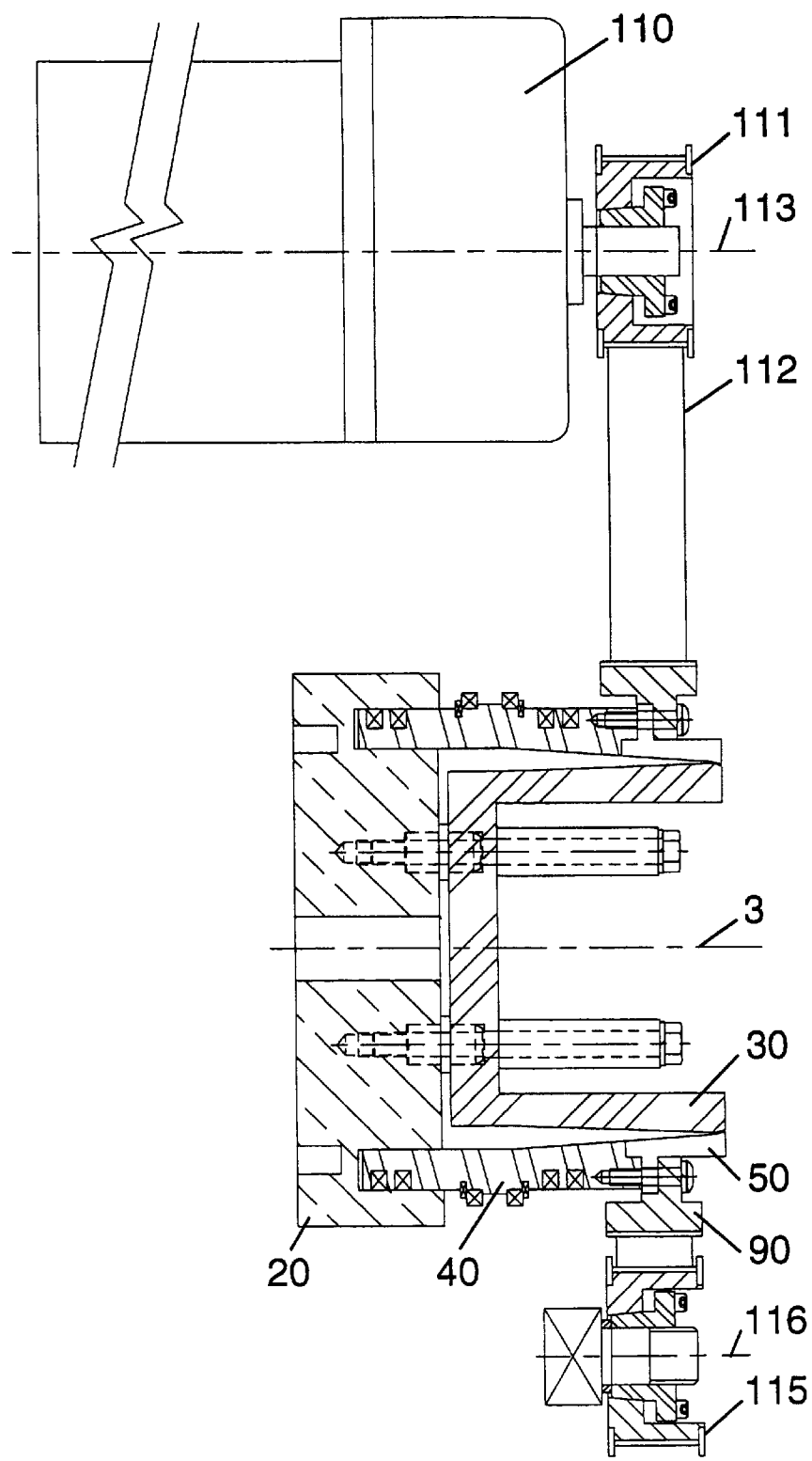
FIG. 7A is a cross-sectional side view of an embodiment of the invention having a motor and belt for rotating an outer ring about a mandrel.
Figure 7B:
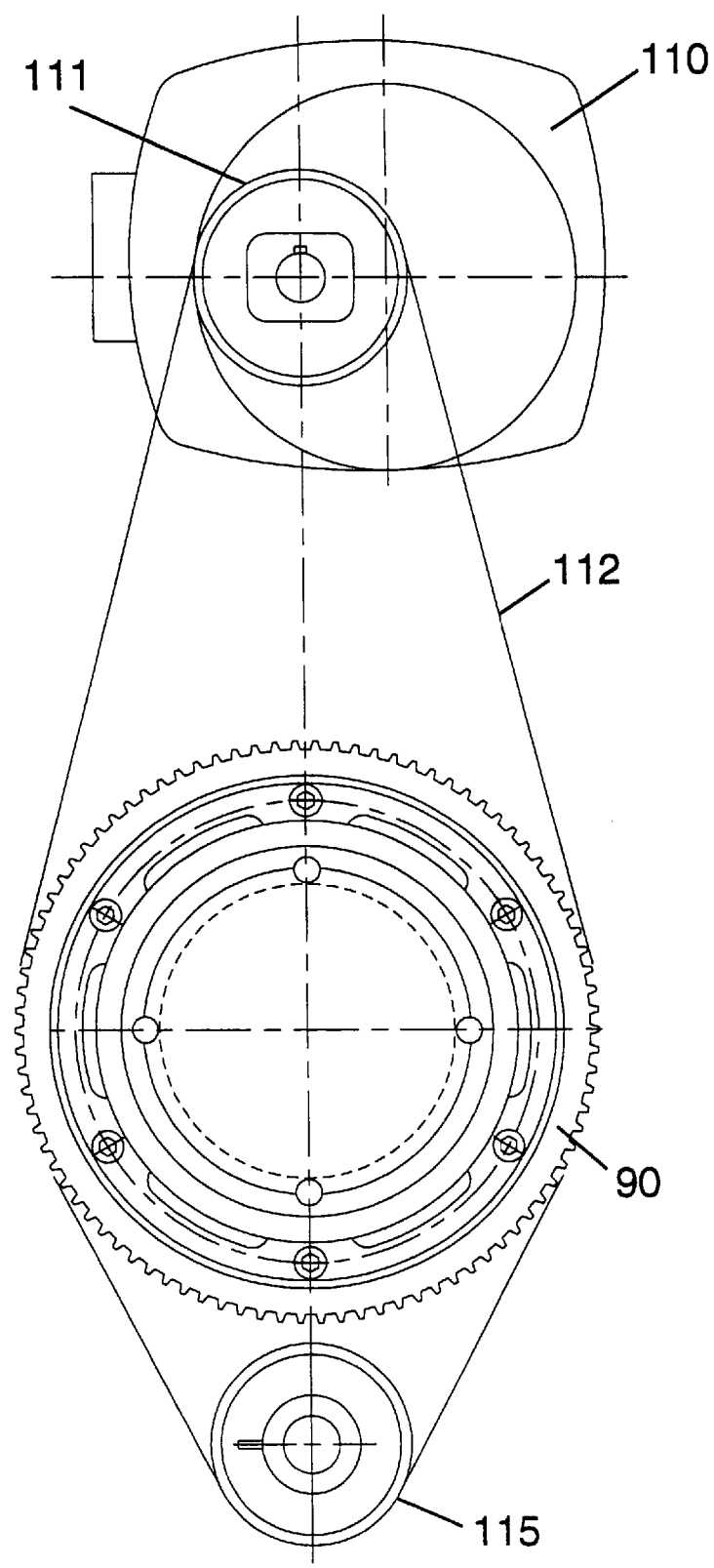
FIG. 7B is an end view of the embodiment of the invention as shown in FIG. 7A.

Referring to FIGS. 7A and 7B, side and end views of portions of an embodiment of the invention for rotating the outer ring of the die are shown, respectively. The mandrel 30 is attached to the mounting plate 20 so that the mandrel 30 is locked in place. The seal ring 40 and outer ring 50 are rotatably mounted around the mandrel 30. A die wheel 90 is also attached to the outer ring 50. All of these members have longitudinal central axes which are collinear with longitudinal central axis 3. The device also has a motor 110 which has a drive axis 113 which is parallel to longitudinal central axis 3. Attached to a drive shaft of motor 110, there is a drive wheel 111. The motor 110 and drive wheel 111 are positioned so that drive wheel 111 lies in the same plane as the die wheel 90, the plane being perpendicular to the longitudinal central axis 3. Opposite the drive wheel 111, the system further has a snubber wheel 115 which is also positioned in the perpendicular plane of the drive wheel 111 and the die wheel 90. The snubber wheel 115 has a snubber axis 116 which is also parallel to the longitudinal central axis 3. Thus, the drive wheel 111 and the snubber wheel 115 are positioned at opposite ends of the system with the die wheel 90 between. A drive belt 112 engages the drive wheel 111, the die wheel 90 and the snubber wheel 115. The snubber wheel 115 has no drive mechanism for turning the drive belt 112. Rather, the snubber wheel 115 is an idle wheel which only turns with the drive belt 112 when the drive belt 112 is driven by the motor 110. The snubber wheel 115 serves only to evenly distribute forces exerted by the drive belt 112 on the die wheel 90. Because the drive wheel 111 and snubber wheel 115 are positioned on opposite sides of the die wheel 90, forces exerted by the drive belt 112 on the die wheel 90 are approximately equal in all transverse directions. If the snubber wheel 115 were not placed in this position and the drive belt 112 engaged only the drive wheel 111 and the die wheel 90, a net force would be exerted by the drive belt 112 on the die wheel 90 in the direction of the motor 110. This force would pull the die wheel 90 and thus the outer ring 50 out of center from its position about the stationary mandrel 30. Of course, this would have the detrimental effect of producing an extrudate tube of biodegradable material which would have a wall thickness greater on one side than on the other. Therefore, the snubber wheel 115 is positioned in the system to prevent the die wheel 90 from being pulled from its central location around the mandrel 30.

In a preferred embodiment, the drive belt 112 is a rubber belt. Alternatively, chains or mating gears may be used to mechanically connect the motor 110 to the die wheel 90. A typical one-third horse power electric motor is sufficient to produce the necessary torque to drive the drive belt 112. Further, the gear ratios between the drive wheel 111 and the die wheel 90 are such that the die wheel 90 may preferably rotate at approximately 15 rotations per minute. Depending on the particular gear system employed, alternative embodiments require more powerful motors.

Figure 8:
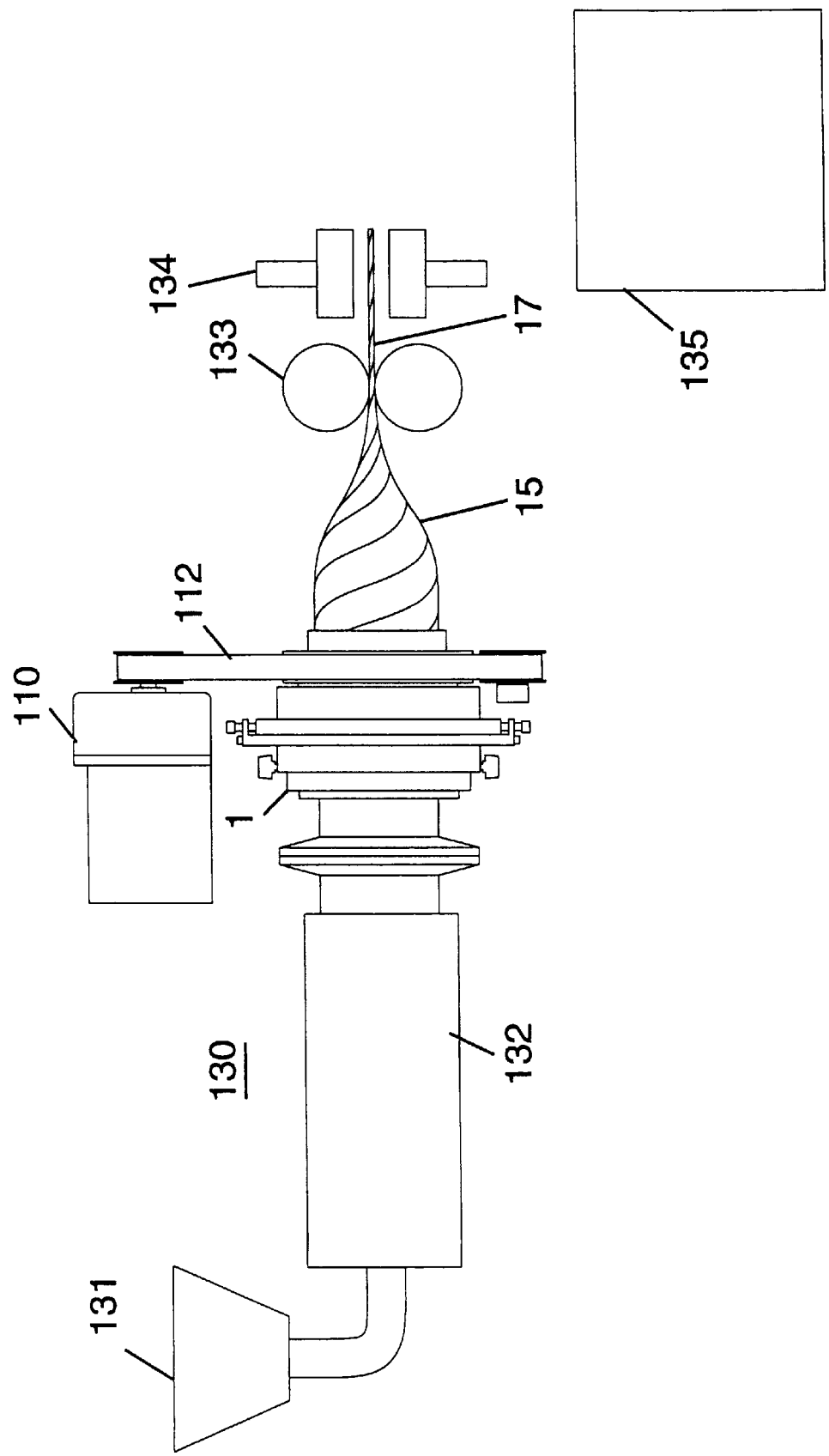
FIG. 8 is a side view of a system for producing molded objects from biodegradable material, the system comprising an extruder, a rotating extrusion die, a cylindrical extrudate, rollers, and molding devices.
Figure 9:
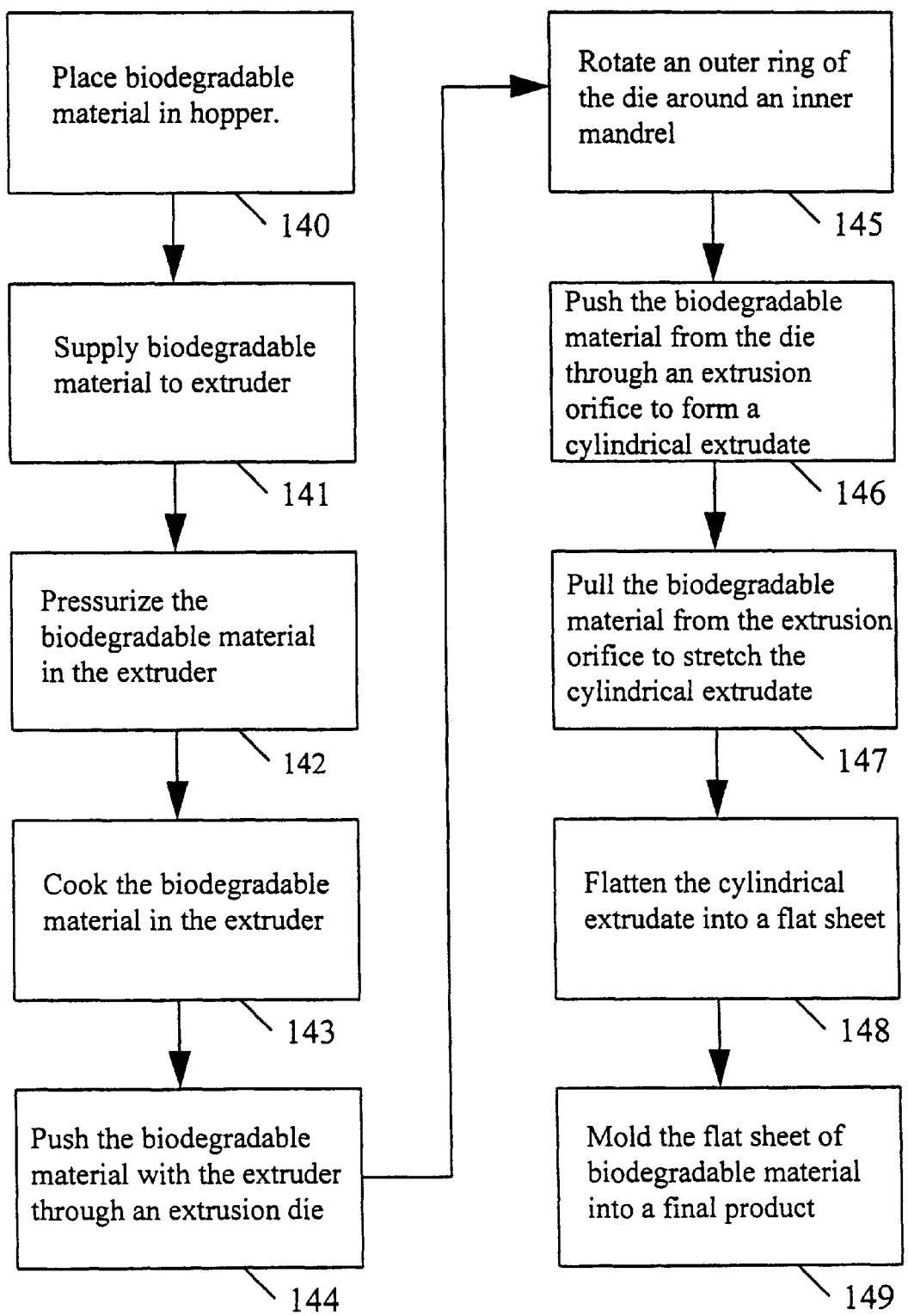
FIG. 9 is a flow chart of a process embodiment of the invention.

Referring to FIGS. 8 and 9, system and method embodiments of the invention are described for producing a biodegradable final product, respectively. The system 130 has a hopper 131 into which biodegradable material is initially placed (step 140). The hopper 131 supplies (step 141) biodegradable material to an extruder 132 which pressurizes (step 142) and cooks (step 143) the biodegradable material. The extruder 132 pushes (step 144) the biodegradable material through an extrusion die 1. The extrusion die 1 is an embodiment of the rotating extrusion die of the present invention and is driven by a motor 110 with a drive belt 112. As the biodegradable material is pushed (step 144) through the extrusion die 1, an outer ring of the die 1 is rotated (step 145) around an inner mandrel. The biodegradable material is pushed (step 146) from the extrusion die 1 through an extrusion orifice to form a cylindrical extrudate 15. The cylindrical extrudate 15 is then pulled (step 147) from the extrusion orifice by a pair of press rollers 133. Next, the press rollers 133 flatten (step 148) the cylindrical extrudate 15 into a sheet 17 of biodegradable material. The sheet 17 of biodegradable material is then molded (step 149) between corresponding molds 134 to form the biodegradable material into final products. The shaped final products are then deposited in bin 135.

According to alternative embodiments of the invention, it is desirable to stretch the cylindrical extrudate 15 as it exits the extrusion orifice 5. This is accomplished by rotating the press rollers 133 slightly faster than a speed necessary to keep pace with the exit rate of the cylindrical extrudate 15 from the extrusion orifice 5. As the press rollers 133 rotate faster, the cylindrical extrudate 15 is pulled by the press rollers 133 from the extrusion orifice 5 so that the cylindrical extrudate 15 is stretched in the longitudinal direction before it is flattened into a flat 2-ply sheet.

Figure 10A:
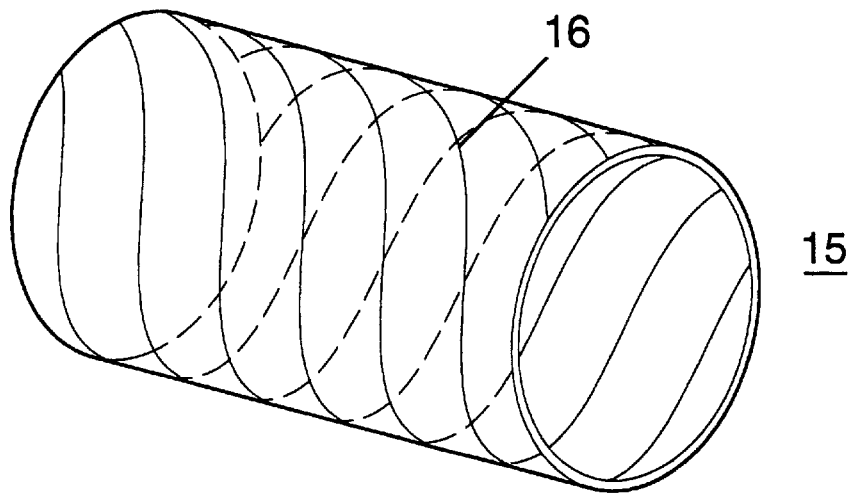
FIG. 10A is a perspective view of a cylindrical extrudate of biodegradable material having helical extrusion lines.

Referring to FIG. 10A, an example of a biodegradable extrudate from the extrusion die of the present invention is shown. The extrudate 15 exits from the extrusion orifice 5 (see FIG. 2 for die components) as a cylindrical structure. Typically, while not meant to be limited thereby, it is believed the polymer chains of the biodegradable material are aligned in the direction of extrusion to produce an extrudate which has its greatest structural integrity in the extrusion direction. If the extrudate 15 exits the extrusion orifice 5 as the outer ring 50 is rotated around the mandrel 30, the extrudate 15 orients along extrusion lines 16.

Figure 10B:
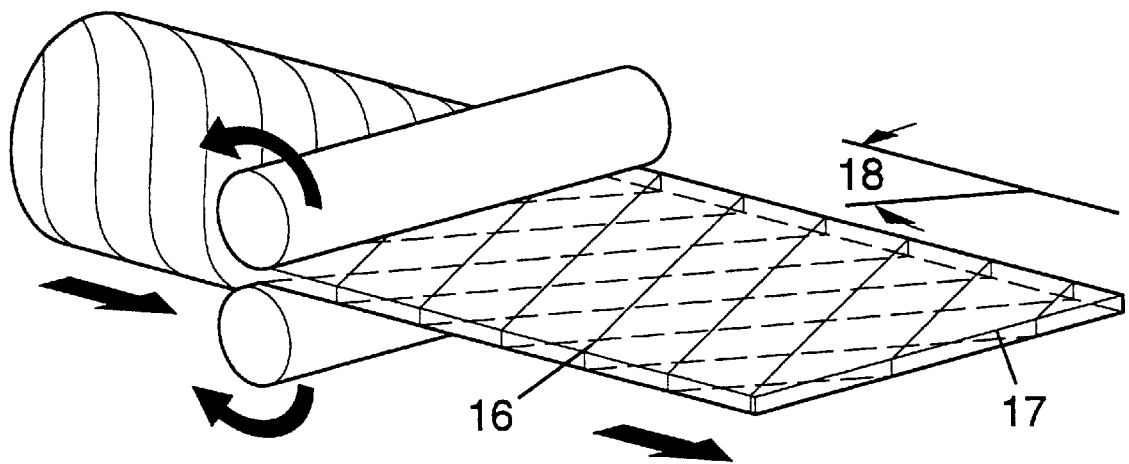
FIG. 10B is a perspective view of a sheet of biodegradable material produced from the extrudate shown in FIG. 10A.

Preferably, the cylindrical extrudate 15 is collapsed to form a sheet of biodegradable material having two extrudate layers. As shown in FIG. 10B, a perspective view of a sheet of extrudate material produced from the tubular extrudate of FIG. 10A is shown. The sheet 17 is produced simply by rolling the extrudate 15 through two rollers to compress the tubular extrudate 15 into the sheet 17. The sheet 17 consequently comprises extrusion lines 16 which form a cross-hatch pattern. The sheet 17 is comprised of two layers, one of which previously formed one side of the tubular extrudate 15 while the second layer of the sheet 17 previously formed the other side of the extrudate 15. Therefore, because the extrusion lines 16 were helically wound around the extrudate 15, when the sheet 17 is formed, the extrusion lines 16 of the two layers run in opposite directions. The extrusion line angle 18 of the extrusion lines 16 may be adjusted by controlling the flow rate of the extrudate 15 from the extrusion orifice 5 of the die 1 (see FIG. 2 for die components), and controlling the speed of angular rotation of the outer ring 50 about the mandrel 30. If it is desirable to increase the extrusion line angle 18, the die is adjusted to increase the angular speed of the outer ring 50 relative to the mandrel 30, and/or to decrease the flow rate of the extrusion material from the extrusion die. As noted above, the flow rate of the biodegradable material through the die is controlled by adjusting the size of the extrusion orifice 5 and/or the flow control channel 4.

According to one embodiment of the invention, the outer ring 50 of the die 1 is made to rotate in both clockwise and counter-clockwise directions about the mandrel 30 to produce a biodegradable extrudate wherein the extrusion lines have a wave pattern. To produce this extrudate, the outer ring 50 is first rotated in one direction and then rotated in the opposite direction. Depending on the rates of direction change, the pattern produced is sinusoidal, zigzag, or boxed. The periods and amplitudes of these wave patterns are adjusted by altering the rate of rotation of the outer ring 50 and the flow rate of the biodegradable material through the extrusion die 1.

Many different drive systems are available for alternating the direction of rotation of the outer ring 50. For example, the motor 110 of the embodiment shown in FIGS. 7A and 7B is made to alternate directions of rotation. As the motor 110 changes directions of rotation, the drive wheel 111, drive belt 112 and die wheel 90 consequently change directions.

Figure 11:
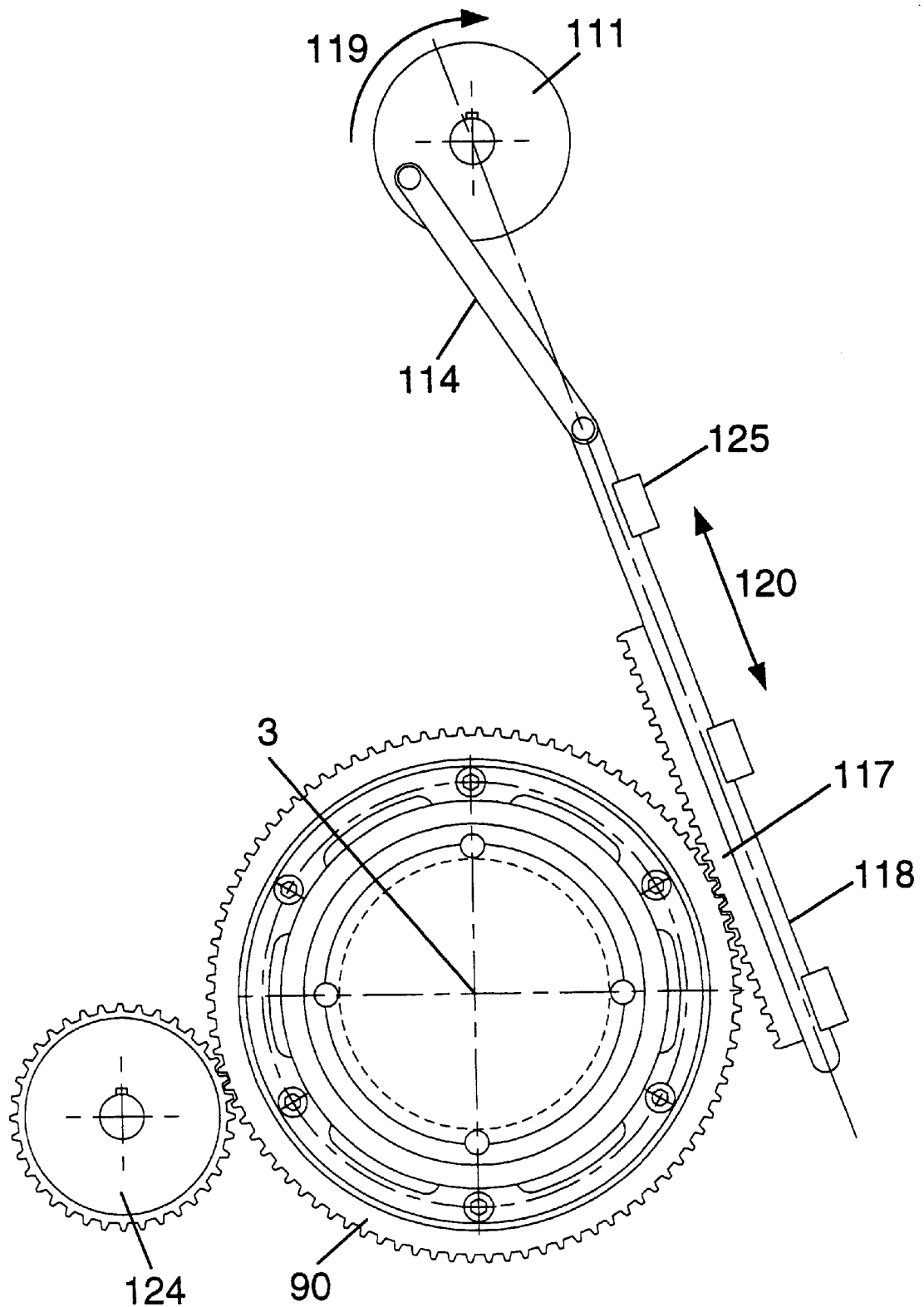
FIG. 11 is an end view of an embodiment of the invention for rotating the die wheel of the rotating die, the device having a rack gear.

Alternatively, as shown in FIG. 11, the die wheel 90 is a spur gear with radial teeth parallel to the longitudinal central axis 3. The teeth of the die wheel 90 are engaged by teeth of a rack gear 117. Opposite the rack gear 117, an idler gear 124 is engaged with the die wheel 90 to prevent the rack gear 117 from pushing the outer ring 50 out of alignment with the mandrel 30 (See FIG. 2). The rack gear 117 is mounted on a slide support 118 and moves linearly along a slide direction 120 which is transverse to the longitudinal central axis 3. The slide support 118 is connected to a drive wheel 111 via a linkage 114. In particular, one end of the linkage 114 is connected to an end of the slide support 118 and the other end of the linkage 114 is connected to the drive wheel 111 at its periphery. The slide support 118 is braced by brackets 125 so that slide support 118 is only allowed to move along slide direction 120. As the drive wheel 111 rotates clockwise around rotation direction 119, the linkage 114 pushes and pulls the slide support 118 back and forth along slide direction 120. The back and forth movement of the slide support 118 rotates the die wheel 90 and the outer ring 50 alternatively in clockwise and counterclockwise directions.

Figure 12A:
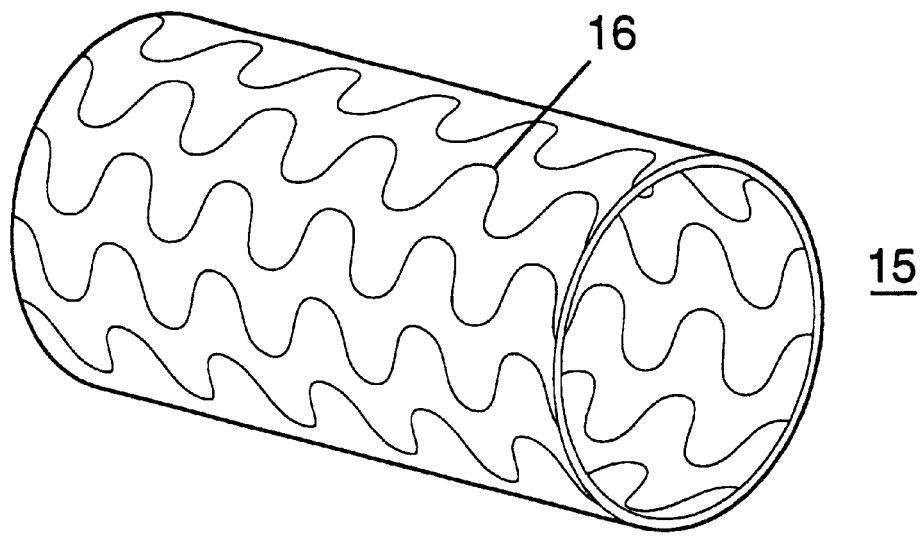
FIG. 12A is a perspective view of a cylindrical extrudate having sinusoidal extrusion lines.
Figure 12B:
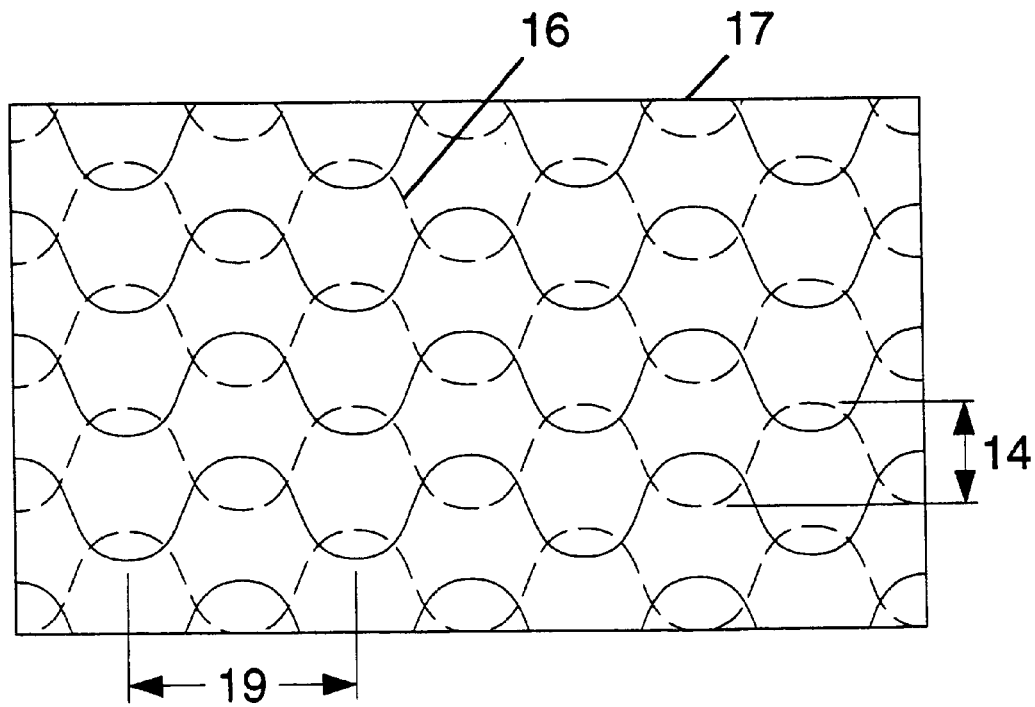
FIG. 12B is a top view of a sheet of biodegradable material produced from the extrudate shown in FIG. 12A.

Since the linkage 114 is connected to the drive wheel 111 at its periphery, as noted above, the alternative clockwise and counter-clockwise rotation of the outer ring 50 is a sinusoidal oscillatory type motion. Thus, this embodiment of the invention produces a biodegradable extrudate 15 with extrusion lines 16 which have a sine wave pattern as shown in FIG. 12A. As described above, the extrudate 15 is rolled into a sheet 17 having two layers as shown in FIG. 12B. The period of the sine waves are identified by reference character 19 and the amplitude is identified by reference character 14. The period 19 and amplitude 14 of extrusion lines 16 may be adjusted by controlling the flow rate of the extrudate 15 from the extrusion orifice 5 of the die 1 (see FIG. 2 for die components), and controlling the speed of angular rotation of the outer ring 50 about the mandrel 30. If it is desirable to increase the period of the sine waves, the die is adjusted to decrease the angular speed of the outer ring 50 relative to the stationary mandrel 30, and/or to increase the flow rate of the extrusion material from the extrusion orifice 5. As noted above, the flow rate of the biodegradable material through the die is controlled by adjusting the size of the extrusion orifice 5 and/or the flow control channel 4. Further, if it is desirable to increase the amplitude 14 of the sine waves, the angular range of motion of the outer ring 50 is increased so that the outer ring 50 rotates further around the stationary mandrel 30 before it stops and changes direction. While many parameters may be altered to produce this result, a simple modification is to use a drive wheel 111 which has a relatively larger diameter.

Figure 13:
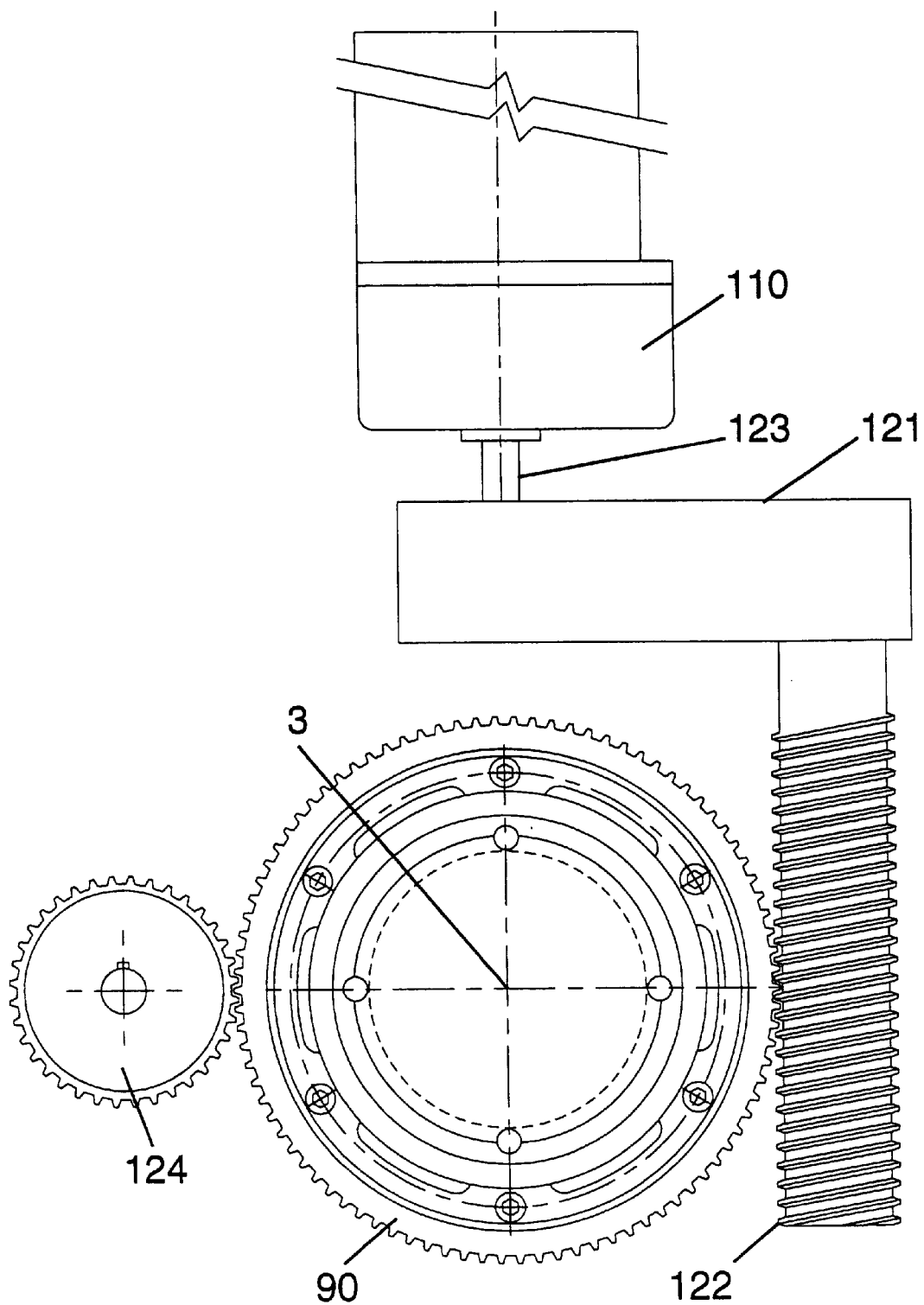
FIG. 13 is an end view of a device for rotating the die wheel of an embodiment of the invention wherein the system comprises a worm gear.

A similar embodiment of the invention which rotates the outer ring in clockwise and counter-clockwise directions is shown in FIG. 13. As before, the die wheel 90 is a spur gear with radial teeth parallel to the longitudinal central axis 3. The teeth of the die wheel 90 are engaged by teeth of a worm gear 122 which is positioned with its axis of rotation transverse to the longitudinal central axis 3. Opposite the worm gear 122, an idler gear 124 is engaged with the die wheel 90 to prevent the worm gear 122 from pushing the outer ring 50 out of alignment with the mandrel 30 (see FIG. 2). The worm gear 122 is driven by a motor 110 with a transmission 121 between. A drive shaft 123 of the motor 110 is connected to a power side of the transmission 121 and the worm gear 122 is connected to a drive side of the transmission 121. While the motor 110 rotates the drive shaft 123 in only one direction, the transmission 121 rotates the worm gear 122 in both clockwise and counter-clockwise directions. Further, in one embodiment, the transmission 121 rotates the worm gear 122 at different speeds even though the motor 110 operates at only one speed. A similar embodiment comprises a motor and transmission which drive a pinion gear which engages the die wheel 90. Since the worm gear 122 is rotated at a constant speed in each direction, this embodiment of the invention produces a biodegradable extrudate which has a zigzag pattern of extrusion lines 16.

Figure 14A:
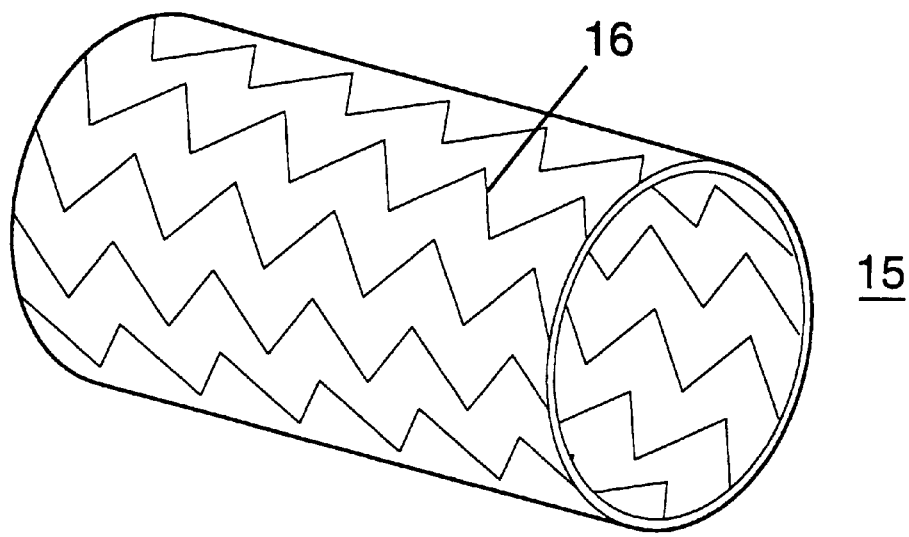
FIG. 14A is a perspective view of an extrudate of biodegradable material wherein the extrudate is cylindrical in shape and has zigzag extrusion lines.
Figure 14B:
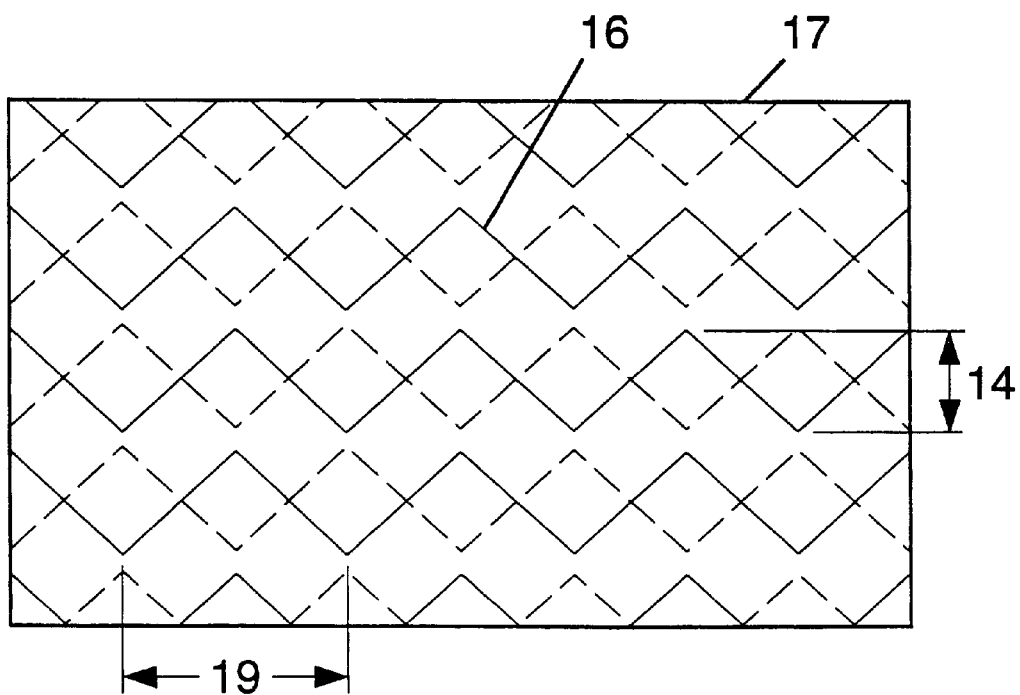
FIG. 14B is a top view of a sheet of biodegradable material produced from the extrudate shown in FIG. 14A.

Since the motor 110 runs at constant angular velocity and the transmission is used to change the direction of rotation of the worm gear 122, the alternative clockwise and counter-clockwise rotation of the outer ring 50 is an oscillatory type motion. Thus, this embodiment of the invention produces a biodegradable extrudate 15 with extrusion lines 16 which have a linear oscillatory wave pattern or zigzag wave pattern as shown in FIG. 14A. As described above, the extrudate 15 is rolled into a sheet 17 having two layers as shown in FIG. 14B. The period of the zigzag waves are identified by reference character 19 and the amplitude is identified by reference character 14. The period 19 and amplitude 14 of extrusion lines 16 is adjusted by controlling the flow rate of the extrudate 15 from the extrusion orifice 5 of the die 1 (see FIG. 2 for die components), and controlling the speed of angular rotation of the outer ring 50 about the mandrel 30. If it is desirable to increase the period of the zigzag waves, the die is adjusted to decrease the angular speed of the outer ring 50 relative to the stationary mandrel 30, and/or to increase the flow rate of the extrusion material from the extrusion orifice 5. As noted above, the flow rate of the biodegradable material through the die is controlled by adjusting the size of the extrusion orifice 5 and/or the flow control channel 4. Further, if it is desirable to increase the amplitude 14 of the zigzag waves, the angular range of motion of the outer ring 50 is increased so that the outer ring 50 rotates further around the stationary mandrel 30 before it stops and changes direction. While many parameters may be altered to produce this result, a simple modification is to control the transmission 121 to allow the worm gear 122 to run longer in each direction before reversing the direction.

While the particular embodiments for extrusion dies as herein shown and disclosed in detail are fully capable of obtaining the objects and advantages herein before stated, it is to be understood that they are merely illustrative of the preferred embodiments of the invention and that no limitations are intended by the details of construction or design herein shown other than as described in the appended claims.

LIST OF CHARACTER DESIGNATIONS

1. Die
3. Longitudinal Central Axis
4. Flow Control Channel
5. Extrusion Orifice
6. Direction Arrow
10. Extruder Adapter
11. Back Plate
14. Extrusion Wave Amplitude
15. Extrudate
16. Extrusion Lines
17. Sheet
18. Extrusion Line Angle
19. Extrusion Wave Period
20. Mounting Plate 21. Mounting Shoulder
22. Spin Channel
23. Flow Bore
24. Countersunk Holes
25. Flow Surface
30. Mandrel
31. Mandrel Base
32. Mandrel Sides
33. Base Flow Surface
34. Countersunk Holes
35. Risers
36. Mandrel Bolts
37. Mandrel Lip
40. Seal Ring
41. Superior Piston Rings
42. Lateral Support Bearings
43. Bearing Spacer Flange
44. Retaining Rings
45. Grooves
46. Piston Slots
47. Notch
50. Outer Ring
51. Ring Portion
52. Fastener Flange
53. Outer Ring Lip
55. Outer Die Structure
60. Gap Adjusting Ring
61. Lock Screws
62. Inner Portion
63. Outer Portion
64. Centering Lugs
65. Lug Bolts
66. Centering Bolts
67. Threaded Holes
70. Bearing Housing
71. Bearing Portion
72. Support Portion
73. Lateral Support Flange
74. Screws
75. Slip Holes
76. Bearing Surface
80. End Cap
81. Stabilizer
82. Fastener Flange
83. Fastener Holes
84. Lateral Support Flange
90. Die Wheel
91. Wheel Fastener
92. Wheel Flange
93. Drive Section
100. Spacer
101. Rib
102. Male Ends
110. Motor
111. Drive Wheel
112. Drive Belt
113. Drive Axis
114. Linkage
115. Snubber Wheel
116. Snubber Axis
117. Rack Gear
118. Slide Support
119. Rotation Direction
120. Slide Direction
121. Transmission
122. Worm Gear
123. Drive Shaft
124. Idler Gear
125. Brackets
130. Biodegradable Product Producing System
131. Hopper
132. Extruder
133. Press Rollers
134. Molds
135. Bin

What is claimed is:

1. An extrusion die for extruding biodegradable material, the extrusion die comprising:
    a mandrel;
    an outer member positioned near said mandrel defining an extrusion orifice between said mandrel and said outer member;
    a member in communication with at least one defining member of said extrusion orifice, wherein said member is capable of producing relative movement between said outer member and said mandrel, wherein the relative movement has a component transverse to an extrusion direction of biodegradable material through the extrusion orifice;
    a flow control device which controls flow of biodegradable material through the extrusion die; and
    a positioning device which positions said outer member and said mandrel relative to each other.

2. An extrusion die as claimed in claim 1, wherein said member reverses the direction of relative movement between said outer member and said mandrel.

3. An extrusion die as claimed in claim 1, further comprising a mounting plate having a flow bore which conducts biodegradable material toward said extrusion orifice, wherein said outer member is rotatably mounted to said mounting plate, wherein said mandrel is fixedly mounted to said mounting plate.

4. An extrusion die as in claim 1, wherein said flow control device comprises a gap adjustment ring which adjusts the width of said extrusion orifice, wherein said outer member is connected to said gap adjustment ring, wherein said gap adjustment ring adjusts the width of said extrusion orifice by translating the outer member.

5. An extrusion die as in claim 1, wherein said flow control device comprises a flow control channel which throttles flow of the biodegradable material through the die.

6. An extrusion die as claimed in claim 5, further comprising a mounting plate and at least one spacer, wherein said mandrel is attached to said mounting plate with said at least one spacer between, wherein said mounting plate and said mandrel define said flow control channel.

7. An extrusion die as claimed in claim 1, wherein said positioning device modifies a geometry of said extrusion orifice.

8. An extrusion die as claimed in claim 1, wherein said positioning device shifts said outer member in a direction transverse to a longitudinal axis of said outer member.

9. An extrusion die for extruding biodegradable material, said extrusion die comprising:
    a cylindrical mandrel;
    a cylindrical outer ring positioned around said mandrel;
    an annular extrusion orifice between said mandrel and said outer ring;
    a member in communication with at least one defining member of said annular extrusion orifice which produces angular relative movement between said outer ring and said mandrel;
    a flow control device which controls flow of biodegradable material through the extrusion die, wherein the flow control device comprises a mechanism which translates said outer ring to adjust the width of said annular extrusion orifice; and a positioning device which positions said outer ring and said mandrel relative to each other.

10. An extrusion die as claimed in claim 9, wherein said member reverses the direction angular relative movement of said outer ring around said mandrel.

11. An extrusion die as in claim 9, wherein said outer ring comprises an inner surface which is conically shaped, wherein the mechanism which translates said outer ring is a gap adjustment ring, and wherein said outer ring is connected to said gap adjustment ring.

12. An extrusion die for extruding biodegradable material, said extrusion die comprising:

a mandrel;

an outer member positioned near said mandrel defining an extrusion orifice between said mandrel and said outer member;

a mounting plate having a flow bore which conducts biodegradable material toward said extrusion orifice, wherein said mandrel is fixedly mounted to said mounting plate and said outer member is movably mounted to said mounting plate;

a member which moves said outer member relative to said mandrel in a direction having a component transverse to an extrusion direction of biodegradable material through the extrusion orifice;

a flow control device which controls flow of biodegradable material through the extrusion die, wherein said flow control device comprises a flow control channel upstream of the extrusion orifice, wherein the flow control channel throttles flow of the biodegradable material through the die, wherein said mandrel is attached to said mounting plate with at least one spacer between, wherein said mounting plate and said mandrel define said flow control channel; and a positioning device which positions said outer member and said mandrel relative to each other, wherein said positioning device comprises a shifting device for moving the outer member and the mandrel relative to each other and a fixing device which fixes the relative positions of said outer member and said mandrel.

13. An extrusion die as claimed in claim 12, wherein said member reverses the direction of relative movement between said outer member and said mandrel.

14. An extrusion die as claimed in claim 12, wherein said flow control channel is a disc shaped cavity between said mandrel and said mounting plate, and wherein the biodegradable material flows through the flow control channel from a central location in the flow control channel outwardly to a peripheral location in the flow control channel.

15. An extrusion die as claimed in claim 12, wherein said shifting device of said positioning device shifts said outer member in a direction transverse to a longitudinal axis of said extrusion orifice.

16. An improved process for the extrusion of biodegradable material wherein said extrusion comprises flowing the biodegradable material in a flow direction through an orifice, said improvement comprising:

moving the biodegradable material in a direction having a component transverse to the flow direction during extrusion;

controlling the flow rate of biodegradable material through the extrusion die during extrusion, wherein said controlling comprises adjusting the head pressure of the biodegradable material in the extrusion die and adjusting at least one cross-sectional area of a biodegradable material flow path within the extrusion die; and modifying the orifice geometry.

17. A process as in claim 16, wherein said moving comprises rotating an outer ring relative to a mandrel, wherein said rotating comprises adjusting the rotation speed of the outer ring relative to the mandrel and reversing the direction of rotation of the outer ring relative to the mandrel.

18. A process as in claim 16, wherein said controlling comprises adjusting the cross-sectional area of the extrusion orifice.

19. A process as in claim 16, wherein said controlling comprises adjusting the cross-sectional area of a biodegradable material flow path at a location upstream of an extrusion orifice.

20. A process for manufacturing biodegradable shaped products of increased strength, said process comprising:

extruding a biodegradable material, wherein said extruding comprises moving the biodegradable material in a first direction through an orifice to produce an extrudate;

modifying the orifice geometry;

moving the biodegradable material in a second direction having a component transverse to the first direction during said extruding;

controlling the flow rate of biodegradable material through the extrusion die during said extruding, wherein said controlling comprises adjusting the cross-sectional area of an extrusion orifice and wherein said controlling further comprises adjusting the cross-sectional area of a biodegradable material flow path at a location upstream of the extrusion orifice;

compressing the extrudate; and molding the compressed extrudate of biodegradable material into a product.

21. A process as in claim 20, wherein said extruding comprises flowing the biodegradable material through an annular orifice to produce a cylindrical extrudate, and wherein the orifice is defined by a mandrel and an outer ring and wherein said moving comprises rotating the outer ring relative to the mandrel.

22. A process as in claim 20, wherein said adjusting the cross-sectional area of a biodegradable material flow path at a location upstream of the extrusion orifice comprises throttling the biodegradable material through a flow control channel.

23. A process as in claim 20, further comprising stretching the extrudate along the first direction before said compressing and said molding the extrudate.

24. A process as in claim 20, wherein said moving is shearing.

* * * * *